US 10,035,718 B2

(12) United States Patent
Oinuma et al.

(10) Patent No.: US 10,035,718 B2
(45) Date of Patent: Jul. 31, 2018

(54) WATER TREATMENT APPARATUS AND WATER TREATMENT METHOD

(71) Applicant: MITSUBISHI ELECTRIC CORPORATION, Chiyoda-ku (JP)

(72) Inventors: Gaku Oinuma, Chiyoda-ku (JP); Masakazu Taki, Chiyoda-ku (JP); Yasutaka Inanaga, Chiyoda-ku (JP); Teruki Naito, Chiyoda-ku (JP)

(73) Assignee: MITSUBISHI ELECTRIC CORPORATION, Chiyoda-ku (JP)

( * ) Notice: Subject to any disclaimer, the term of this patent is extended or adjusted under 35 U.S.C. 154(b) by 0 days.

(21) Appl. No.: 15/533,249

(22) PCT Filed: Dec. 18, 2015

(86) PCT No.: PCT/JP2015/085513
§ 371 (c)(1),
(2) Date: Jun. 5, 2017

(87) PCT Pub. No.: WO2016/117259
PCT Pub. Date: Jul. 28, 2016

(65) Prior Publication Data
US 2017/0362107 A1    Dec. 21, 2017

(30) Foreign Application Priority Data
Jan. 20, 2015    (JP) .................................. 2015-008815

(51) Int. Cl.
*C01B 13/11*    (2006.01)
*C02F 1/32*    (2006.01)
(Continued)

(52) U.S. Cl.
CPC ................ *C02F 1/78* (2013.01); *C01B 13/11* (2013.01); *C02F 1/32* (2013.01); *C02F 1/4608* (2013.01);
(Continued)

(58) Field of Classification Search
CPC ...... C02F 1/32; C02F 1/4608; C02F 1/46109; C02F 1/46114; C02F 1/467; C02F 1/4672;
(Continued)

(56) References Cited

U.S. PATENT DOCUMENTS

2004/0035798 A1* 2/2004 Holland .............. C02F 1/46109
210/695
2010/0240943 A1* 9/2010 Solnik ................. C02F 1/46109
588/311

FOREIGN PATENT DOCUMENTS

JP    2007-307486 A    11/2007
JP    4635204 B2    2/2011
(Continued)

OTHER PUBLICATIONS

International Search Report dated Mar. 8, 2016 in PCT/JP2015/085513 filed Dec. 18, 2015.

*Primary Examiner* — Lucas Stelling
(74) *Attorney, Agent, or Firm* — Oblon, McClelland, Maier & Neustadt, L.L.P.

(57) ABSTRACT

A water treatment apparatus including: discharge treatment units each including a ground electrode and a discharge electrode opposing the ground electrode, and water to be treated is treated by forming a discharge between the ground electrode and the discharge electrode, and generating ozone by the discharge, and moreover causing the water to be treated to contact the discharge; a water reservoir portion that collects, in the interior of the treatment tank, the water to be treated having been subject to water treatment by one of the discharge treatment units; and an ozone supply section that supplies the ozone in the treatment tank to the water to be treated in the water reservoir portion are provided, and
(Continued)

wherein the water to be treated passes through the plurality of discharge treatment units as a continuous flow.

14 Claims, 16 Drawing Sheets

(51) Int. Cl.
*C02F 1/46* (2006.01)
*C02F 1/461* (2006.01)
*C02F 1/467* (2006.01)
*C02F 1/48* (2006.01)
*C02F 1/78* (2006.01)
*C02F 9/00* (2006.01)

(52) U.S. Cl.
CPC ........ *C02F 1/4672* (2013.01); *C02F 1/46114* (2013.01); *C02F 1/48* (2013.01); *C02F 9/00* (2013.01); *C02F 2201/782* (2013.01); *C02F 2209/04* (2013.01); *C02F 2209/08* (2013.01); *C02F 2209/20* (2013.01); *C02F 2209/23* (2013.01)

(58) Field of Classification Search
CPC ...... C02F 1/48; C02F 1/78; C02F 9/00; C02F 2201/78; C02F 2201/782; C02F 2201/784; C02F 2209/04; C02F 2209/08; C02F 2209/20; C02F 2209/23; C01B 13/11

See application file for complete search history.

(56) References Cited

FOREIGN PATENT DOCUMENTS

| | | |
|---|---|---|
| JP | 2011-251275 A | 12/2011 |
| JP | 2012-96141 A | 5/2012 |
| WO | 2010/055729 A1 | 5/2010 |
| WO | 2015/111240 A1 | 7/2015 |
| WO | 2015/111465 A1 | 7/2015 |

\* cited by examiner

WATER TREATMENT APPARATUS AND WATER TREATMENT METHOD

TECHNICAL FIELD

The present invention relates to a water treatment apparatus and a water treatment method in which water to be treated is treated using ozone, radicals, and the like generated by a discharge.

BACKGROUND ART

Until now, ozone and chlorine have been widely used in vertical water treatment. However, persistent substances that are not decomposed by ozone or chlorine may be contained in, for example, industrial wastewater and the like. In particular, removal of dioxins, dioxane, and the like is a major problem.

In some areas, a method of removing persistent substances by combining ozone ($O_3$) with hydrogen peroxide ($H_2O_2$) or ultraviolet light, thereby causing hydroxyl radicals (OH radicals), which are higher in activity than ozone or chlorine, to be generated in water to be treated, is in practical use. However as equipment and operation costs thereof are very high, this method is not very prevalent.

In view of this, a method has been proposed in which persistent substances are removed with high efficiency by causing OH radicals and the like generated by a discharge to act directly on water to be treated. More specifically, a treatment such as the following is being implemented.

Water to be treated containing bacteria is supplied from a water supply pipe at an upper step portion of a step-like flow path in which a plurality of step portions and a plurality of flat plate portions linked thereto are alternately connected, toward the step-like flow path.

Then, plasma generated by a plasma generation device is irradiated toward the water to be treated flowing as a water film along the step-like flow path, causing water molecules in the water to be treated to dissociate and generate O radicals and OH radicals, which eliminate the bacteria in the water.

With this water sterilization apparatus and water sterilization method, contact between the water to be treated and the plasma is facilitated such that the bacteria in the water to be treated can be sufficiently eliminated (see PTL 1, for example).

Further, a water treatment apparatus has also been proposed in which water to be treated is treated by arranging, in an inclined state, a pair of electrode plates that vertically oppose each other so that water to be treated flows downward onto a lower electrode, and forming a barrier discharge between the electrodes. With this water treatment apparatus, the water to be treated can be treated efficiently using a simple configuration (see PTL 2, for example).

CITATION LIST

Patent Literature

[PTL 1] Japanese Patent Application Publication No. 2012-96141

[PTL 2] Japanese Patent No. 4635204

SUMMARY OF INVENTION

Technical Problem

However, the following problems exist in the abovementioned prior art.

With the conventional water treatment apparatus indicated in PTL 1, water to be treated can be treated by causing O radicals and OH radicals generated by plasma to act directly thereon. However, an amount dissolved into the water to be treated of ozone and hydrogen peroxide generated from the O radicals and the OH radicals cannot be controlled. For this reason, a problem exists in that treatment of water to be treated through reactions in water by ozone and hydrogen peroxide cannot be practiced effectively, and efficient water treatment cannot be performed.

Meanwhile, in the conventional water treatment apparatus indicated in PTL 2, ozone or OH radicals generated by a discharge come into contact with a water surface of water to be treated, a portion thereof is dissolved to form dissolved ozone and dissolved hydrogen peroxide, and water treatment proceeds through reactions in water. However, with the water treatment apparatus according to PTL 2, dissolved amounts of ozone and hydrogen peroxide cannot be independently determined. For this reason, problems exist in that the reactions in water cannot be used effectively and, moreover, when a water quality of the water to be treated changes, an optimal operation to suit this change cannot be performed.

The present invention has been made to solve the above-mentioned problems, and an object thereof is to obtain a water treatment apparatus and a water treatment method that can perform highly efficient and high-speed decomposition of persistent substances or removal of highly concentrated organic contamination, and are capable of treatment that corresponds to a water quality of water to be treated.

Solution to Problem

A water treatment apparatus according to the present invention is a water treatment apparatus in which a plurality of discharge treatment units are provided in an interior of a treatment tank, the discharge treatment units including a ground electrode and a discharge electrode opposing the ground electrode, and water to be treated is treated by forming a discharge between the ground electrode and the discharge electrode and generating ozone by the discharge and moreover causing the water to be treated to contact the discharge, the water treatment apparatus being provided with a water reservoir portion that collects, in the interior of the treatment tank, the water to be treated having been treated by one discharge treatment unit of the plurality of discharge treatment units, and an ozone supply section that supplies the ozone in the treatment tank to the water to be treated collected in the water reservoir portion, wherein the water to be treated passes through the plurality of discharge treatment units as a continuous flow.

A water treatment method according to the present invention is a water treatment method to be executed in a water treatment apparatus in which a plurality of discharge treatment units are provided in an interior of a treatment tank, the discharge treatment units including a ground electrode and a discharge electrode opposing the ground electrode, and water to be treated is treated by forming a discharge between the ground electrode and the discharge electrode and generating ozone by the discharge and moreover causing the water to be treated to contact the discharge, the water treatment method including a step in which the water to be treated having been treated by one discharge treatment unit of the plurality of discharge treatment units is collected in the interior of the treatment tank in a water reservoir portion, and a step in which the ozone in the treatment tank is supplied to the water to be treated collected in the water reservoir portion, wherein the water to be treated is treated by the water to be treated passing through the plurality of discharge treatment units as a continuous flow.

Advantageous Effects of Invention

A water treatment apparatus and a water treatment method according to the present invention are a water treatment apparatus and a water treatment method in which a plurality of discharge treatment units are provided in an interior of a treatment tank, the discharge treatment units including a ground electrode and a discharge electrode opposing the ground electrode, and water to be treated is treated by forming a discharge between the ground electrode and the discharge electrode and causing the water to be treated to contact the discharge while ozone is generated by the discharge. A water reservoir portion that collects, in the interior of the treatment tank, the water to be treated having been subjected to treatment by one of the plurality of discharge treatment units, and an ozone supply section that supplies the ozone in the treatment tank to the water to be treated in the water reservoir portion are provided, and the water to be treated passes through the plurality of discharge treatment units as a continuous flow. As a result, a water treatment apparatus and a water treatment method that can perform highly efficient and high-speed decomposition of persistent substances or removal of highly concentrated organic contamination, and are capable of treatment that corresponds to a water quality of water to be treated, can be obtained.

DESCRIPTION OF EMBODIMENTS

Preferred embodiments of a water treatment apparatus and a water treatment method according to the present invention will be described in detail below using the drawings.

First Embodiment

Figure 1:
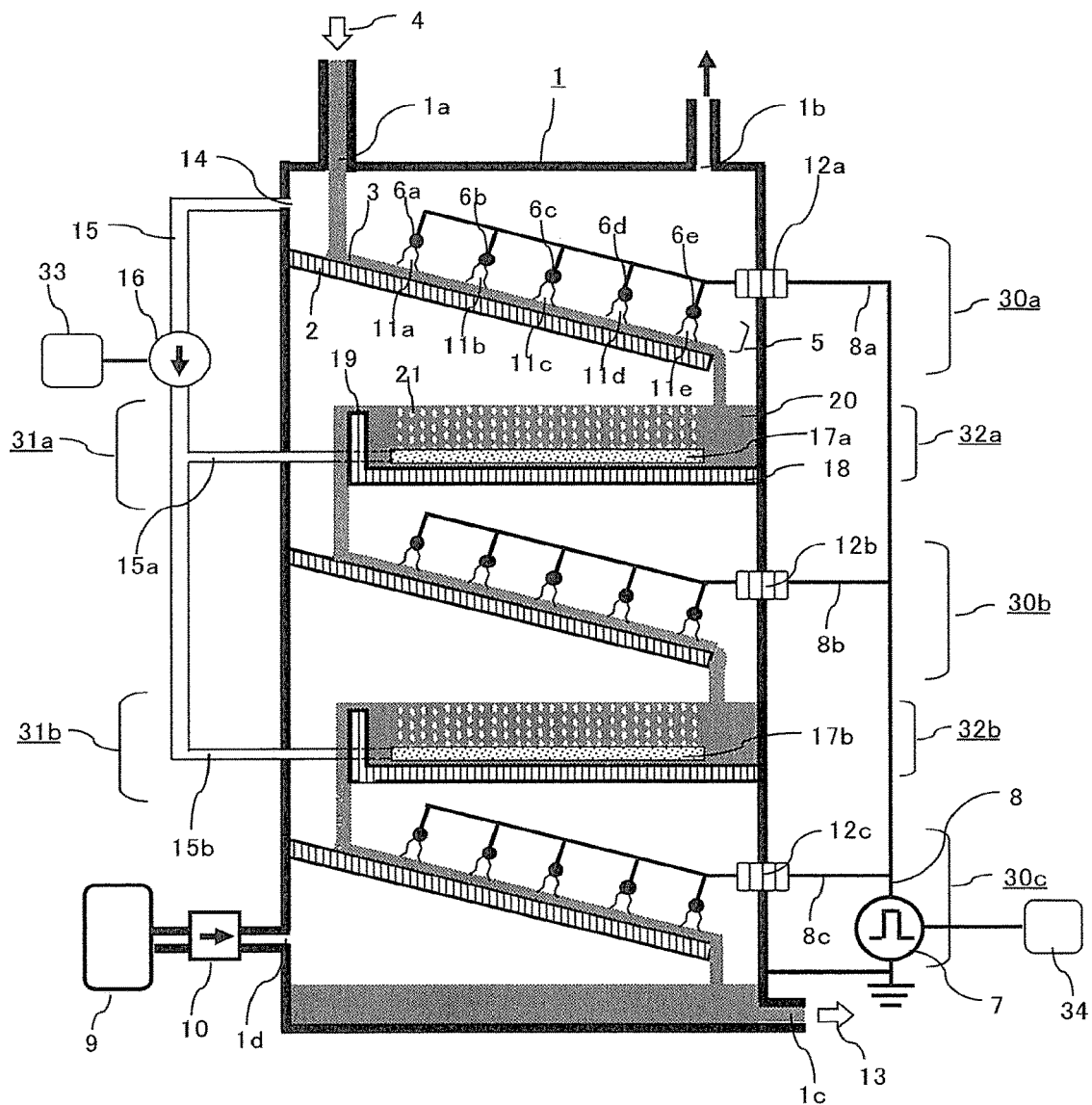
FIG. 1 is a cross-sectional view of a water treatment apparatus according to a first embodiment of the present invention.

FIG. 1 is a cross-sectional view of a water treatment apparatus according to a first embodiment of the present invention. In FIG. 1, a water supply port $1a$ and a gas exhaust port $1b$ are provided at an upper part of a metal treatment tank 1 having a hermetically sealed structure. A drainage port $1c$ is provided at a lower part of the treatment tank 1.

Meanwhile, a gas supply port $1d$ is provided on a side surface of the treatment tank 1. Three discharge treatment units $30a$, $30b$, and $30c$ and two water reservoir portions (water reservoirs) $32a$ and $32b$ are provided in an interior of the treatment tank 1.

The three discharge treatment units $30a$, $30b$, and $30c$ all have the same configuration and each include a flat plate electrode 2, that is, a ground electrode, and a plurality of (five in FIG. 1) wire electrodes $6a$, $6b$, $6c$, $6d$, and $6e$, that is, discharge electrodes. The flat plate electrode 2 is disposed in the interior of the treatment tank 1 at an incline with respect to a horizontal plane. In other words, an upstream side end portion (a left end portion in FIG. 1) of the flat plate electrode 2 is higher than a downstream side end portion (a right end portion in FIG. 1) thereof.

The upstream side end portion is held so as to be connected to a left wall surface of the treatment tank 1 and the downstream side end portion is held so as to be not connected to a wall surface of the treatment tank 1. The wire electrodes $6a$, $6b$, $6c$, $6d$, and $6e$ are formed above the flat plate electrode 2 via a predetermined interval with respect to the flat plate electrode 2. The wire electrodes $6a$, $6b$, $6c$, $6d$, and $6e$ are disposed at mutual intervals in a left-right direction of FIG. 1.

In addition, the wire electrodes $6a$, $6b$, $6c$, $6d$, and $6e$ are disposed at equal intervals from an upper surface of the flat plate electrode 2. Further the wire electrodes $6a$, $6b$, $6c$, $6d$, and $6e$ are parallel to and horizontally stretched along a width direction of the flat plate electrode 2 (a depth direction of the page on which FIG. 1 is depicted). The wire electrodes $6a$, $6b$, $6c$, $6d$, and $6e$ and the flat plate electrode 2 constitute a pair of electrodes.

The two water reservoir portions 32a and 32b both have the same configuration and each is provided with a base plate 18 and a sidewall 19. In FIG. 1, a right side end portion of the base plate 18 is connected to a right wall surface of the treatment tank 1, and the plate shaped sidewall 19 is attached to a left side end portion of the base plate 18 so as to face a plumb direction.

In other words, the water reservoir portions 32a and 32b form box-shaped water reservoirs enclosed by the wall surface of the treatment tank 1, the base plate 18, and the sidewall 19.

The discharge treatment units 30a, 30b, and 30c and the water reservoir portions 32a and 32b are formed so as to mutually alternate between left and right in the plumb direction of the treatment tank 1. In other words, the discharge treatment unit 30a is provided at an uppermost part of the treatment tank 1, and the flat plate electrode 2 of the discharge treatment unit 30a is connected to the left wall surface of the treatment tank 1. The water reservoir portion 32a is provided below the discharge treatment unit 30a, and the base plate 18 of the water reservoir portion 32a is connected to the right wall surface of the treatment tank 1. The discharge treatment unit 30b, the water reservoir portion 32b, and the discharge treatment unit 30c are provided in this order in the same way therebelow.

A circulated gas suction port 14 is formed in a vicinity of an uppermost part of a sidewall of the treatment tank 1, and the circulated gas suction port 14 is connected to a circulated gas pipe 15. The circulated gas pipe 15 is provided with a circulation pump 16, which corresponds to a gas circulation device, and an inverter 33, which corresponds to a gas flow regulator, is connected to the circulation pump 16.

At one of two sides of the circulated gas pipe 15, with the circulation pump 16 being disposed therebetween, the circulated gas pipe 15 branches at an opposite side to the circulated gas suction port 14 and forms a circulated gas pipe 15a, 15b. The circulated gas pipe 15a is connected to a diffuser plate (a diffusing member) 17a provided in the water reservoir portion 32a and a circulated gas pipe 15b is connected to a diffuser plate 17b provided in the water reservoir portion 32b. The circulated gas pipe 15, the circulated pump 16, and the diffuser plates 17a and 17b constitute an ozone supply section. Further, ozone dissolution units 31a and 31b are formed by the water reservoir portions 32a and 32b and the ozone supply section.

Current introduction terminals 12a, 12b, and 12c are provided on a right sidewall of the treatment tank 1. In the discharge treatment unit 30a, the wire electrodes 6a, 6b, 6c, 6d, and 6e are connected to each other by a wire 8a, and the wire 8a passes through the current introduction terminal 12a and communicates with an exterior of the treatment tank 1.

In the same way, a wire 8b connected to the wire electrodes 6a, 6b, 6c, 6d, and 6e of the discharge treatment unit 30b passes through the current introduction terminal 12b and communicates with the exterior of the treatment tank 1, and a wire 8c connected to the wire electrodes 6a, 6b, 6c, 6d, and 6e of the discharge treatment unit 30c passes through the current introduction terminal 12c and communicates with the exterior of the treatment tank 1. Here, the wires 8a, 8b, and 8c and the treatment tank 1 are electrically insulated from each other by the current introduction terminals 12a, 12b, and 12c.

On the exterior of the treatment tank 1, the wires 8a, 8b, and 8c are connected to each other to form a single wire 8. An output of a high voltage side of a pulse power supply 7 provided on the exterior of the treatment tank 1 is connected to the wire 8. Meanwhile, an output of a ground side of the pulse power supply 7 is connected to the treatment tank 1 and electrically grounded.

Further, the respective flat plate electrodes 2 of the discharge treatment units 30a, 30b, and 30c are all constructed from metal and connected to the side surface of the treatment tank 1. For this reason, the flat plate electrodes 2 reflect ground potential.

Due to this configuration, the respective wire electrodes 6a, 6b, 6c, 6d, and 6e of the discharge treatment units 30a, 30b, and 30c are electrically connected in parallel to the pulse power supply 7.

Further, the pulse power supply 7 is provided with a power regulator 34, that is, a discharge power regulator. The power regulator 34 is capable of regulating a peak value, a pulse width, a pulse repetition, and a pulse waveform of a pulse voltage output by the pulse power supply 7.

A gas supply source 9 filled with oxygen gas is connected to the gas supply port 1d via a flow controller 10.

Next, operations of the water treatment apparatus in the first embodiment will be described.

Oxygen gas from the gas supply source 9 is regulated to a pre-set flow rate by the flow controller 10, and then supplied into the treatment tank 1 from the gas supply port 1d. Meanwhile, gas in the treatment tank 1 is exhausted from the gas exhaust port 1b at a flow rate identical to the supplied oxygen gas flow rate. Hence, after a predetermined time period has elapsed, air is exhausted from the treatment tank 1 and an atmosphere having a high oxygen concentration is formed in the treatment tank 1.

Water to be treated 4 supplied into the treatment tank 1 from the water supply port 1a flows downward while forming a water film 3 on the flat plate electrode 2 of the discharge treatment unit 30a, and drops downward from a furthest downstream part thereof (the right side end portion in FIG. 1). The water to be treated 4 having dropped downward from the discharge treatment unit 30a is captured in the water reservoir portion 32a. When a water level of the water to be treated 4 in the water reservoir portion 32a becomes higher than the sidewall 19, the water to be treated 4 begins to overflow from the water reservoir portion 32a and drops downward.

In the same way therebelow, the water to be treated 4 passes through the discharge treatment unit 30b, the water reservoir portion 32b, and the discharge treatment unit 30c in this order, finally drops down into a bottom of the treatment tank 1, and is drained from the drainage port 1c as treated water 13. At this time, a portion of the water to be treated 4 is volatized as water vapor, such that an atmosphere having a high oxygen concentration and including water vapor is formed in the interior of the treatment tank 1. Here, a gap 5, that is, a gas layer, is formed between the water film 3 and the wire electrodes 6a, 6b, 6c, 6d, and 6ee. In other words, a thickness of the water film 3 is regulated such that the gap 5 is formed between the wire electrodes 6a, 6b, 6c, 6d, and 6e and the water surface of the water film 3. The thickness of the water film is adjusted by the flow rate of the supplied water to be treated 4, an inclination angle of the flat plate electrode 2 with respect to the horizontal plane, or a surface roughness of the flat plate electrode 2.

Here, the pulse power supply 7 is operated and a pulse voltage is applied to the wire electrodes 6a, 6b, 6c, 6d, and 6e, such that discharges 11a, 11b, 11c, 11d, and 11e are formed from the wire electrodes 6a, 6b, 6c, 6d, and 6e in a direction of the flat plate electrode 2. In the process of flowing on the flat plate electrode 2, the water to be treated 4 touches the discharges 11a, 11b, 11c, 11d, and 11e in this order, such that water treatment such as removal of persistent substances is performed. Further, ozone is generated by the discharges 11a, 11b, 11c, 11d, and 11e such that the treatment tank 1 reaches a state of being filled with ozone.

Here, further, the circulation pump 16 is operated such that the gas in the treatment tank 1 is sucked out from the circulated gas suction port 14 and supplied to the diffuser plates 17a and 17b in the water reservoir portions 32a and 32b. Hence, the circulated gas rises as gas bubbles 21 in the water to be treated 4 of the water reservoir portions 32a and 32b, whereupon ozone generated by the discharges 11a, 11b, 11c, 11d, and 11e is dissolved in the water to be treated 4 and water treatment is performed.

Next, principles by which the water to be treated 4 is treated by the water treatment apparatus indicated in the first embodiment will be described. Note that, although here description is given using decomposition of organic substance as an example, it is a well-known fact that $O_3$ and OH radicals generated by a discharge are also effective for removal of bacteria, decolorization, and deodorization.

Discharges 11a, 11b, 11c, 11d, and 11e are formed by applying a pulse voltage to the wire electrodes 6a, 6b, 6c, 6d, and 6e. At this time, oxygen molecules ($O_2$) and water molecules ($H_2O$) in the treatment tank 1 collide with high-energy electrons, and dissociation reactions indicated by the following formulas (1) and (2) occur. Here, e is an electron, O is atomic oxygen, H is atomic hydrogen, and OH is an OH radical.

$$e + O_2 \rightarrow 2O \tag{1}$$

$$e + H_2O \rightarrow H + OH \tag{2}$$

Much of the atomic oxygen generated by the above formula (1) becomes ozone ($O_3$) due to the reaction of the following formula (3). Here, M is a third body of the reaction and represents any molecule or atom present in air.

$$O + O_2 + M \rightarrow O_3 \tag{3}$$

Further, a portion of the OH radicals generated by the above formula (2) become hydrogen peroxide ($H_2O_2$) due to the reaction of the following formula (4).

$$OH + OH \rightarrow H_2O_2 \tag{4}$$

Oxidizing particles (O, OH, $O_3$, and $H_2O_2$) generated by the reactions of the above formulas (1) to (4) react, by the following formula (5), with organic substance near the water surface of the water to be treated 4 flowing along the flat plate electrodes 2 of the discharge treatment units 30a, 30b, and 30c, and oxidatively decompose the organic substance into carbon dioxide ($CO_2$) and water. Here, R is organic substance to be treated.

$$R + (O, OH, O_3, H_2O_2) \rightarrow CO_2 + H_2O \tag{5}$$

Note that O and OH that did not react with the organic substance in the above formula (5) become relatively long-lived $O_3$ and $H_2O_2$ by the above formulas (3) and (4) and a portion thereof is dissolved in the water to be treated 4 by the following formulas (6) and (7). Here, (l) indicates a liquid phase.

$$O_3 \rightarrow O_3(l) \tag{6}$$

$$H_2O_2 \rightarrow H_2O_2(l) \tag{7}$$

$O_3$ (l) and $H_2O_2$ (l) generate OH radicals by a reaction in water as indicated by the following formula (8).

$$O_3(l) + H_2O_2(l) \rightarrow OH(l) \tag{8}$$

$O_3$ (l), $H_2O_2$ (l), and OH (l) generated by the above formulas (6) to (8) decompose organic substance through a reaction in water indicated by the following formula (9).

$$R + (O_3(l), H_2O_2(l), OH(l)) \rightarrow CO_2 + H_2O \tag{9}$$

In the first embodiment, in regions where the water to be treated 4 contacts the discharges 11a, 11b, 11c, 11d, and 11e, organic substance in the water to be treated 4 is decomposed by both of the reactions of the above formulas (5) and (9), and, in regions where the water to be treated 4 does not contact the discharges, organic substance in the water to be treated 4 is decomposed by the reaction of the above formula (9).

Further, in the first embodiment, by supplying the gas in the treatment tank 1 to the diffuser plates 17a and 17b by operating the circulation pump 16, ozone in the treatment tank 1 is dissolved in the water to be treated 4 in the water reservoir portions 32a and 32b.

As a result, organic substance in the water to be treated 4 is decomposed by ozone. Further, $H_2O_2$ (l) and $O_3$ (l) dissolved in the water to be treated 4 generate OH (l) by the above formula (8), which decomposes persistent substances in the water to be treated 4.

Next, the reasons for which highly efficient and high-speed decomposition of persistent substances and removal of highly concentrated organic contamination can be performed by the first embodiment will be described.

As described above, water treatment is executed in the first embodiment by both decomposition of organic substance on a surface layer of the water to be treated 4 by the above formula (5), and by decomposition of organic substance in the water to be treated 4 by the above formula (9). As the reaction of the above formula (5) is a reaction that only occurs on the surface layer of the water to be treated 4, the reaction of the above formula (9) is more important to a water treatment effect as a whole.

Figure 2:
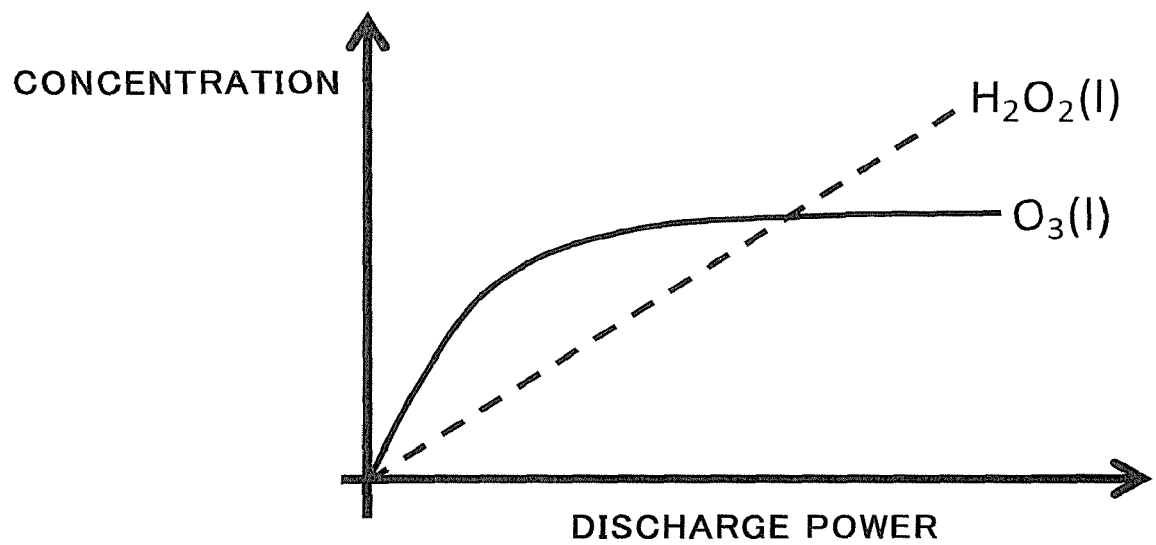
FIG. 2 is a graph showing relationships between a dissolved hydrogen peroxide concentration and a dissolved ozone concentration of water to be treated and discharge power in the first embodiment of the present invention.

Here, FIG. 2 is a graph showing relationships between an $H_2O_2$ (l) concentration and an $O_3$ (l) concentration of the water to be treated 4 and discharge power in the first embodiment of the present invention. As solubility of $H_2O_2$ in water is high, if the power of the discharges 11a, 11b, 11c, 11d, and 11e is increased such that $H_2O_2$ generated by the above formulas (2) and (4) increases, the above formula (7) takes place and the $H_2O_2$ (l) concentration increases. Accordingly, as shown in FIG. 2, the dissolved hydrogen peroxide concentration increases almost proportionally to the discharge power.

Meanwhile, as shown in FIG. 2, the dissolved ozone concentration tends to saturate once a fixed value has been surpassed, and does not increase even when the discharge power is increased. The reason for this will be explained hereinafter.

For ozone, Henry's law as in the following formula (10) is exhibited between an gas phase concentration $C(O_3g)$ and a saturated concentration of dissolved $C^*(O_3l)$ thereof.

$$C^*(O_3l) = m \times C(O_3g) \tag{10}$$

Here, a unit of concentration is mg/l for both. In the above formula (10), m is a distribution coefficient, which, although dependent on temperature and pH, reflects a value of approximately 0.3. Further, a speed at which ozone dissolves in water (a dissolution speed) $v(O_3)$ is given by the following formula (11).

$$v(O_3) = kLa \times (C^*(O_3l) - C(O_3l)) \tag{11}$$

Here, kLa is the overall mass transfer coefficient of ozone, which is an intrinsic value dependent on the system of a water treatment apparatus, and $C(O_3l)$ is the dissolved ozone concentration. Due to the above formula (11), an ozone dissolution speed is higher when the difference between the saturated concentration of dissolved $C^*(O_3l)$ and the dissolved concentration $C(O_3l)$ thereof is larger. For this reason, as ozone dissolution progresses and the dissolved concentration thereof gets closer to the saturated concentration of dissolved, the dissolution speed decreases, and the dissolved ozone concentration asymptotically approaches the fixed value. This is the reason for which the dissolved ozone concentration saturates.

Here, atomic oxygen (O) generated by the above formula (1), and OH radicals (OH) generated by the above formula (2) both have short particle lifetimes of one millisecond or less. For this reason, the generated atomic oxygen (O) and OH radicals (OH) are lost in the gas over a short time period and, as such, barely exist in regions removed from the discharges 11a, 11b, 11c, 11d, and 11e.

Meanwhile, $O_3$ has a long particle lifetime in gas of several minutes or more and, moreover, has a low water solubility. For this reason, a portion of the $O_3$ is dissolved into the water to be treated 4 by the above formula (6), and the rest is present in the gas in the treatment tank 1.

As a result, in the treatment tank 1 almost all of the oxidizing particles present in gas in regions removed from the discharges 11a, 11b, 11c, 11d, and 11e are ozone. Accordingly, when the gas in the treatment tank 1 is sucked out by the circulation pump 16 and supplied to the water to be treated 4, contact between the water to be treated 4 and $O_3$ increases, facilitating ozone dissolution by the above formula (6).

Figure 3:
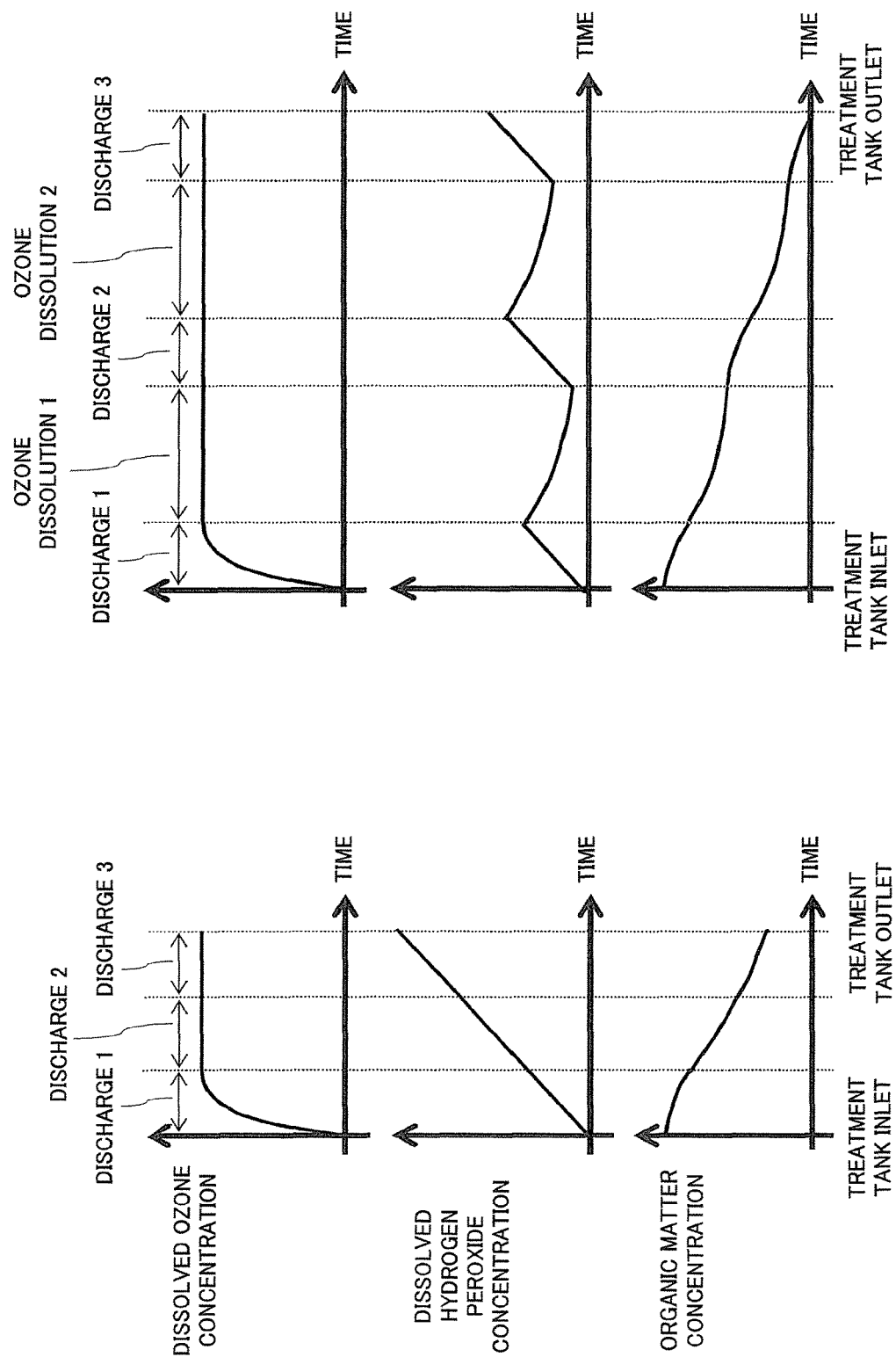
FIGS. 3A and 3B are graphs showing respective changes over time in the dissolved ozone concentration, the dissolved hydrogen peroxide concentration, and an organic substance concentration of the water to be treated in a treatment tank according to the first embodiment of the present invention.

FIGS. 3A and 3B are graphs showing respective changes over time in the dissolved ozone concentration ($O_3$ (l)), the dissolved hydrogen peroxide concentration ($H_2O_2$ (l)), and the organic substance concentration of the water to be treated 4 in the treatment tank 1 according to the first embodiment of the present invention. FIG. 3A corresponds to a case in which the ozone dissolution units 31a and 31b are not included, and FIG. 3B corresponds to a case in which the ozone dissolution units 31a and 31b are included.

Further, in FIGS. 3A and 3B, a discharge 1, a discharge 2, and a discharge 3 correspond respectively to stages at which the water to be treated 4 passes through the discharge treatment units 30a, 30b, and 30c in FIG. 1, and ozone dissolution 1 and ozone dissolution 2 correspond respectively to stages at which the water to be treated 4 passes through the ozone dissolution unit 31a and the ozone dissolution unit 31b in FIG. 1.

In FIG. 3A, the dissolved ozone concentration reaches saturation by the discharge 1 and thereafter does not change. However, the dissolved hydrogen peroxide concentration increases proportionally to contact time with the discharges and steadily increases over the entire treatment time. A reduction speed of the organic substance concentration increases together with the increase in the dissolved hydrogen peroxide concentration at the discharge 1 but, conversely, is decreased at the discharge 3 due to excess accumulation of dissolved hydrogen peroxide.

That is, at the discharge 1, $H_2O_2$ (l) is insufficient with respect to $O_3$ (l), such that $H_2O_2$ (l) is rate limiting in generation of OH (l). Meanwhile, at the discharge 3, $H_2O_2$ (l) is in a state of excess, the proportion of OH (l) generated that is ineffectively consumed due to radical scavenger action of $H_2O_2$ (l) is increased, and the decomposition of organic substance including persistent substances ceases to proceed efficiently.

Meanwhile, in the case of FIG. 3B, in which the ozone dissolution units 31a and 31b are included, operation at the discharge 1 is the same as in FIG. 3A. Further, at ozone dissolution 1, dissolution of hydrogen peroxide does not occur but, due to the ozone in the treatment tank 1 being supplied by the circulated gas, ozone dissolution does occur.

That is, at ozone dissolution 1, the $H_2O_2$ (l) concentration reduces due to consumption of that accumulated at the discharge 1, and $O_3$ (l) maintains a steady concentration as that consumed is replenished. Therefore, at ozone dissolution 1, decomposition of organic substance in the water to be treated 4 proceeds due to the reaction in water of the above formula (9) despite the water to be treated 4 not being in contact with the discharges 11a, 11b, 11c, 11d, and 11e.

At the discharge 2, hydrogen peroxide is dissolved again, and the $H_2O_2$ (l) concentration increases. Similarly therebelow, treatment of the water to be treated 4 proceeds as the water to be treated 4 proceeds through ozone dissolution 2 and the discharge 3. Further, when comparing FIG. 3A and FIG. 3B, a residence time of the water to be treated 4 in the treatment tank 1 differs. In the case of FIG. 3B, the water to be treated 4 is resident in the treatment tank 1 for a longer period of time due to time spent stored in the water reservoir portions 32a and 32b.

As described above, in the first embodiment, the ozone dissolution units 31a and 31b are provided. By providing such a configuration, the residence time of the water to be treated 4 in the treatment tank 1 increases and, even in regions where the water to be treated 4 is not in contact with the discharges, organic substance in the water to be treated 4 is decomposed through reactions in water. For this reason, even if the discharge energy is the same as that when the ozone dissolution units are not included, the organic substance concentration at the point where the water to be treated 4 reaches the drainage port 1c can be reduced. In other words, speed and efficiency of water treatment is improved.

Further, as the water to be treated 4 passes alternatively through the discharge treatment units and the ozone dissolution units, dissolution and consumption of $H_2O_2$(l) is repeated. For this reason, the phenomenon in which $H_2O_2$ (l) accumulates excessively in the water to be treated 4 and generated OH (l) is ineffectively consumed by the radical scavenger action thereof can be suppressed.

Next, the reason for which treatment that corresponds to a water quality of water to be treated is possible with the present embodiment will be described.

Persistent substances such as dioxins, dioxane, and the like are barely decomposed by ozone but are decomposed by OH radicals. That is to say, efficient generation of OH (l) is necessary to the removal of persistent substances. Here, when OH (l) is generated by the above formula (8), an optimal concentration balance exists between $O_3$ (l) and $H_2O_2$ (l).

For example, when $O_3$ (l) is excessively present and $H_2O_2$ (l) is insufficient, the reaction of the above formula (8) does not occur enough and $O_3$ (l) accumulates in the water to be treated 4. Conversely, when $H_2O_2$ (l) is excessively present and $O_3$ (l) is insufficient, the reaction of the above formula (8), likewise, does not occur enough and $H_2O_2$ (l) accumulates in the water to be treated 4.

Further, $O_3$ (l) or $H_2O_2$ (l) having accumulated in the water to be treated 4 consume OH (l) ineffectively as radical scavengers. Accordingly, it is important to appropriately regulate the concentrations of both $O_3$ (l) and $H_2O_2$ (l) in order to perform efficient decomposition treatment of persistent substances.

As shown in FIG. 2, the $H_2O_2$ (l) concentration increases as the discharge power increases, while $O_3$ (l) is saturated. In other words, when the power of the discharges 11a, 11b, 11c, 11d, and 11e is caused to increase by controlling the power regulator 34 in FIG. 1, an amount of $H_2O_2$ (l) generated increases relatively. Moreover, when a flow rate of the circulation pump 16 is caused to increase by the inverter 33 in FIG. 1, an amount of ozone dissolved in the water to be treated 4 increases.

Due to the above operations, in the first embodiment, amounts of $H_2O_2$ and $O_3$ dissolved in the water to be treated 4 can be independently regulated. In other words, the power regulator 34 functions as a hydrogen peroxide dissolution amount regulator, and the inverter 33 functions as an ozone dissolution amount regulator. Hence, an optimal operation that corresponds to the water quality of the water to be treated 4 is possible, and efficient treatment of the water to be treated 4 containing persistent substances can be performed.

Note that, in the first embodiment, the pulse power supply 7 is used for discharge formation, however, as long as a discharge can be stably formed, a power supply applied to the present invention is not necessarily required to be a pulse power supply. It is also possible to use, for example, an AC power supply or a DC power supply as a power supply for discharge formation.

Further, a polarity, a peak voltage value, a repetition frequency, a pulse width, and the like of a voltage output by the pulse power supply 7 can be appropriately determined in accordance with various conditions such as electrode structure and gas type. In general, a peak voltage value of 1 kV to 50 kV is desirable. This is because a stable discharge cannot be formed if the voltage is less than 1 kV, and cost increases markedly if the voltage set to more than 50 kV due to enlargement of the power supply and difficulties involved in electrical insulation.

Further, a repetition frequency of 10 pulse-per-second (pps) or more and 100 kpps or less is desirable. This is because if the repetition frequency is lower than 10 pps, a very high voltage is required to apply sufficient discharge power, whereas if the repetition frequency is higher than 100 kpps, the effect of water treatment is saturated and power efficiency decreases. Further, the voltage, the pulse width, and the pulse repetition frequency may be adjusted in accordance with at least one of the flow rate of the water to be treated 4 or a water quality of a substance to be treated.

Moreover, it is preferable to use a metal material that has excellent resistance to corrosion, such as stainless steel or titanium, for the flat plate electrodes 2. Further, it is also preferable to use a metal material that has excellent resistance to corrosion, such as stainless steel or titanium, for the wire electrodes 6a, 6b, 6c, 6d, and 6e, however, conductive materials other than these can also be used.

In addition, the surfaces of the wire electrodes 6a, 6b, 6c, 6d, and 6e may be covered with a dielectric such as glass or ceramic.

In addition, in the first embodiment, the wire electrodes 6a, 6b, 6c, 6d, and 6e are used as the discharge electrodes, however, the discharge electrodes are not necessarily in the form of a wire. For example, a rod, a needle, a mesh, a screw, a ribbon, a punching metal, or the like can also be used as the discharge electrodes. However, in order to form a stable discharge at a relatively low voltage, it is preferable to configure the discharge electrodes in the form of a wire, a needle, a mesh, a screw, or a ribbon shape, in which electric field concentration occurs more readily than with a plate shape.

Moreover, in the first embodiment, the interior of the treatment tank 1 is set to an atmosphere having a high oxygen concentration by supplying oxygen gas thereto from the gas supply source 9, however, a gas type is not limited to oxygen. As long as in a gas containing oxygen, the reactions of the above formulas (1) to (9) occur, such that water treatment can be performed.

For example, a gas in which nitrogen or a rare gas is mixed with oxygen at an arbitrary ratio can be used. In particular, if a rare gas is used, it is possible to stably form a discharge even at relatively low voltages, and if air is used, a gas cost can be significantly reduced.

Further, a flow rate of the supplied gas does not need to be constant, and can be adjusted as appropriate in accordance with a water quality of the water to be treated 4, discharge conditions, or the like. For example, when an organic substance concentration in the water to be treated 4 is high, a large quantity of oxygen is consumed in the oxidative decomposition process, such that it is preferable to increase the flow rate of the supplied gas. However, when the organic substance concentration in the water to be treated 4 is low, by decreasing the flow rate of the supplied gas, an ozone concentration in the gas increases and the reactions can be speeded up.

In addition, it is also possible to increase the gas flow rate when the apparatus is started up, replace the air in the interior over a short period of time, and then reduce the gas flow rate to a sufficient amount necessary for water treatment. In this way, an amount of gas used can be suppressed and high-speed water treatment is possible.

Moreover, in the first embodiment, five of the wire electrodes 6a, 6b, 6c, 6d, and 6e are used in the discharge treatment units 30a, 30b, and 30c. However, a number of wire electrodes is not limited to five, and can be changed as appropriate in accordance with, for example, dimensions of the flat plate electrodes 2, and the water quality or the treatment flow rate of the water to be treated 4.

Further, it is preferable that a distance between the wire electrodes 6a, 6b, 6c, 6d, and 6e and the flat plate electrodes 2 (distance between electrodes) is not less than 1 mm and not more than 50 mm. This is because if the distance between electrodes is set to less than 1 mm, the possibility increases that the wire electrodes 6a, 6b, 6c, 6d, and 6e will be submerged when the water to be treated 4 is caused to flow, and if the distance between electrodes is set to more than 50 mm, a very high voltage is required for discharge formation.

Further, it is desirable to set a pressure in the treatment tank 1 at or near to atmospheric pressure so as to make supply and drainage of the water to be treated 4 easier. Where necessary, however, the pressure in the treatment tank 1 can be set to positive pressure or negative pressure. When the treatment tank 1 is set to positive pressure, contamination by air from the exterior is suppressed, and the atmosphere in the treatment tank 1 becomes easier to manage.

In addition, when the treatment tank 1 is set to negative pressure, the discharges 11a, 11b, 11c, 11d, and 11e are formed at a relatively low voltage, such that it is possible to downsize and simplify the power supply. Moreover, the discharges 11a, 11b, 11c, 11d, and 11e are more inclined to disperse when the pressure is lower. For this reason, the water to be treated 4 contacts the discharges 11a, 11b, 11c, 11d, and 11e over a wider region, such that efficiency and speed of water treatment are improved.

Note that, in the first embodiment, three of the discharge treatment units 30a, 30b, and 30c and two of the ozone dissolution units 31a and 31b are used. However, a number of discharge treatment units and ozone dissolution units is not limited to the configuration of the first embodiment, and can be set as appropriate in accordance with dimensions of the treatment tank 1, a required water treatment capacity, or the like.

Further, an ozone dissolution unit 31c may be added as a lower stage of the discharge treatment unit 30c such that, in the treatment tank 1, the water to be treated 4 passes through the ozone dissolution unit 31c last. In this case, an effect can be obtained in which the dissolved hydrogen peroxide concentration in the treated water 13 is reduced.

That is to say, as the dissolved hydrogen peroxide has a high persistence, separate addition of chemicals, an activated carbon treatment, or the like may be necessary to remove the dissolved hydrogen peroxide from the treated water 13. However, as dissolved ozone self-decomposes and disappears in water in several minutes to several tens of minutes, there is no need to perform separate ozone removal treatments. By providing the ozone dissolution unit 31c as a lowermost stage, an effect can be obtained in which the dissolved hydrogen peroxide concentration in the treated water 13 is reduced, and the need for a separate hydrogen peroxide removal treatment is eliminated.

Further, the sidewall 19 can be constructed from a mesh or a plate material subjected to slit processing. As a result, when water treatment is stopped, the water to be treated 4 is prevented from remaining in the water reservoir portions 32a and 32b while, due to the effect of the sidewall 19 as a baffle capable of hindering the flow of the water to be treated 4, the water to be treated 4 can be collected in the water reservoir portions 32a and 32b.

Second Embodiment

Figure 4:
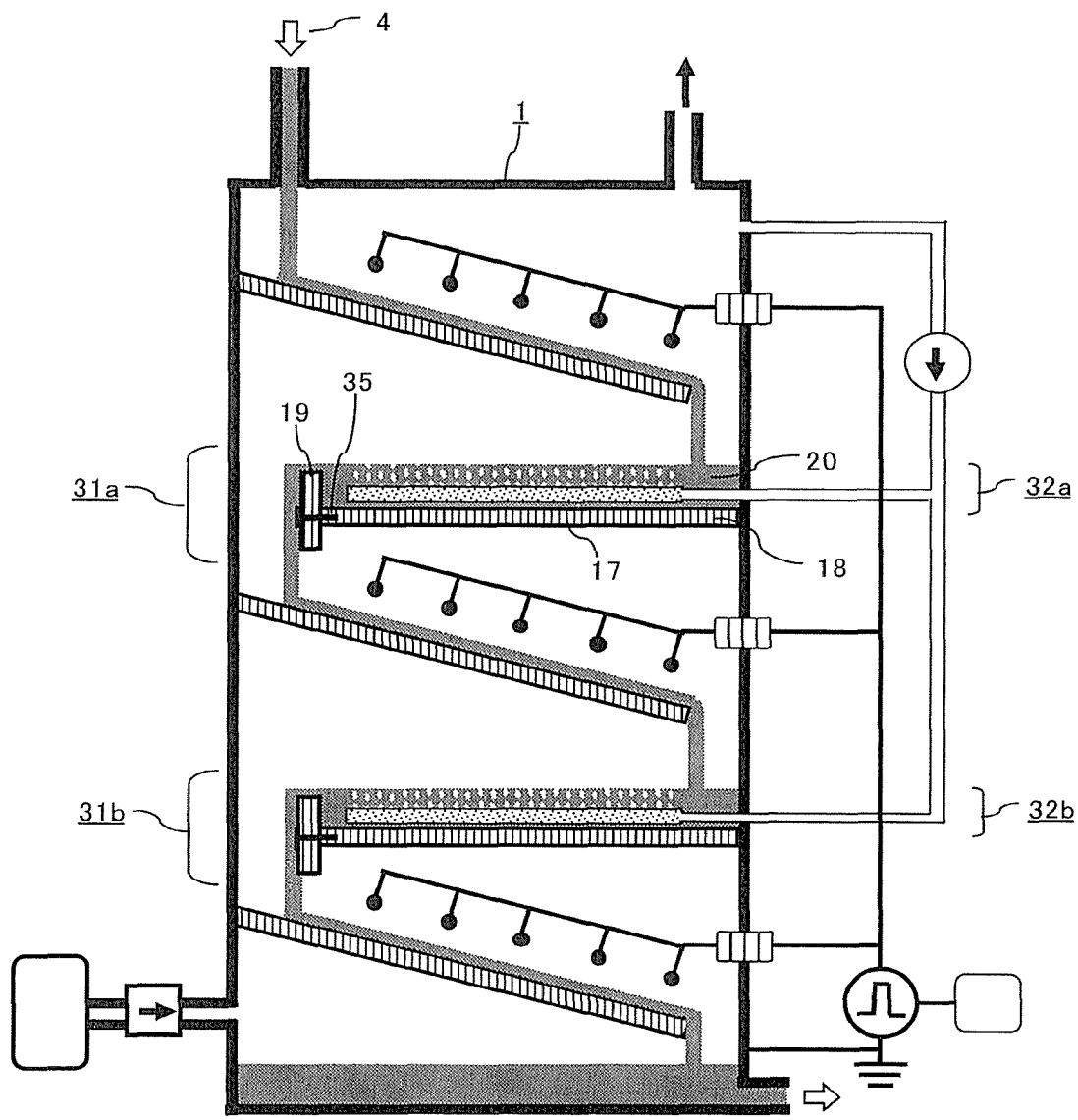
FIG. 4 is a cross-sectional view of a water treatment apparatus according to a second embodiment of the present invention.

FIG. 4 is a cross-sectional view of a water treatment apparatus according to a second embodiment of the present invention. In the second embodiment, a configuration of water reservoir portions 32a and 32b differs from that of the first embodiment, and the inverter 33 provided in the first embodiment is not included. Other configurations are the same as those of the first embodiment.

The two water reservoir portions 32a and 32b in FIG. 4 both have the same configuration, and each is provided with a base plate 18 and a sidewall 19. In FIG. 4, a right side end portion of the base plate 18 is connected to a right wall surface of a treatment tank 1, and the plate shaped sidewall 19 is attached to a left side end portion of the base plate 18 so as to face a plumb direction.

In other words, the water reservoir portions 32a and 32b are configured to be box-shapes enclosed by the wall surface of the treatment tank 1, the base plate 18, and the sidewall 19. Here, the sidewall 19 is movable in a vertical direction with respect to the base plate 18 and is configured to be coupled to the base plate 18 by a bolt 35 upon determination of a connection position with respect thereto.

Hence, with the configuration in FIG. 4, a height from the base plate 18 to an uppermost portion of the sidewall 19 can be adjusted arbitrarily. Other configurations are the same as those of the first embodiment.

In the second embodiment, the height from the base plate 18 to the uppermost portion of the sidewall 19 can be adjusted arbitrarily, such that a volumetric capacity of the water reservoir portions 32a and 32b can be changed. In other words, the base plate 18, the sidewall 19, and the bolt 35 constitute a volumetric capacity regulation mechanism of the water reservoir portions 32a and 32b. Accordingly, an average time (residence time) that the water to be treated 4 is present in the water reservoir portions 32a and 32b, can be determined arbitrarily.

In the first embodiment, an amount of ozone dissolved in the water to be treated 4 is regulated through regulation of the flow rate of the circulation pump 16 by the inverter 33. Meanwhile, in the second embodiment, an amount of ozone dissolved at the ozone dissolution units 31a and 31b is regulated by changing the volumetric capacity of the water reservoir portions 32a and 32b.

That is, when the volumetric capacity of the water reservoir portions 32a and 32b is high, the residence time of the water to be treated 4 increases, an amount of the water to be treated 4 that touches the ozone in the circulated gas increases, and an amount of ozone dissolved in the water to be treated 4 increases. Conversely, when the volumetric capacity of the water reservoir portions 32a and 32b is low, the residence time of the water to be treated 4 decreases, an amount of the water to be treated 4 that touches the ozone in the circulated gas decreases, and an amount of ozone dissolved in the water to be treated 4 decreases. In other words, in the second embodiment, the volumetric capacity regulation mechanism is an ozone dissolution amount regulator.

Due to the operation described above, with the water treatment apparatus in the second embodiment, an amount of ozone dissolved at the ozone dissolution units 31a and 31b can be regulated. As a result, an $O_3$ (l) concentration and an $H_2O_2$ (l) concentration can also be independently regulated and optimal water treatment corresponding to the water quality of the water to be treated 4 performed in the second embodiment.

Note that, in the second embodiment, a connection position of the sidewall 19 with respect to the base plate 18 is determined, whereupon the sidewall 19 and the base plate 18 are coupled to each other by the bolt 35, such that the volumetric capacity of the water reservoir portions 32a and 32b is changed, however, the volumetric capacity regulation mechanism is not limited to such a configuration. For example, the sidewall 19 may be electrically driven such that a position thereof in the vertical direction can be adjusted from the exterior of the treatment tank 1. In this case, the volumetric capacities of the water reservoir portions 32a and 32b can be changed without opening the treatment tank 1, such that workability and an operating ratio of the apparatus is improved. Further, dimensions of the base plate 18 may be made changeable as the volumetric capacity regulation mechanism.

Third Embodiment

Figure 5:
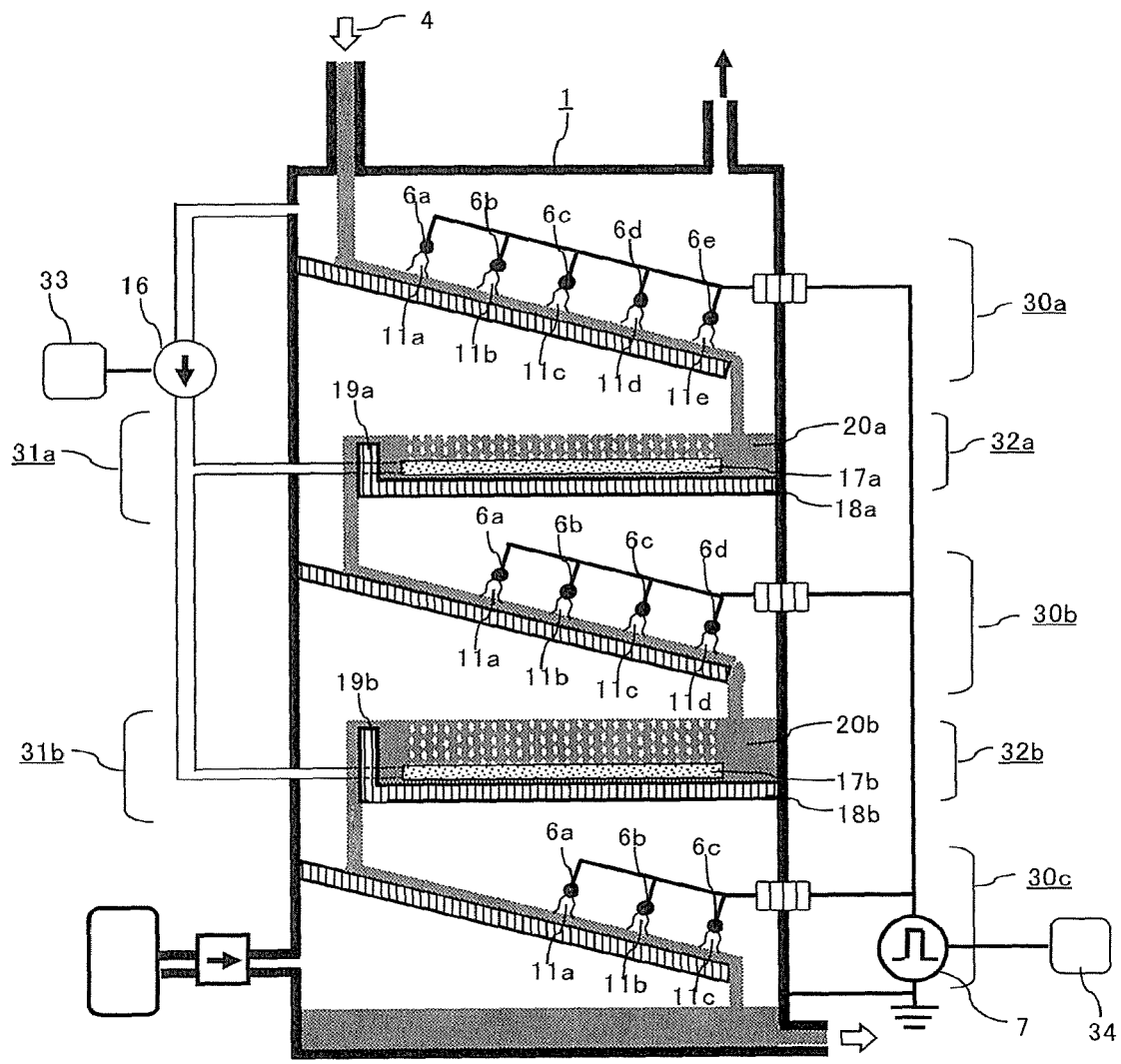
FIG. 5 is a cross-sectional view of a water treatment apparatus according to a third embodiment of the present invention.

FIG. 5 is a cross-sectional view of a water treatment apparatus according to a third embodiment of the present invention. In the third embodiment, a configuration of discharge treatment units 30a, 30b, and 30c and a configuration of ozone dissolution units 31a and 31b differ from those in the first embodiment.

In the configuration of the third embodiment indicated in FIG. 5, a number of wire electrodes differs for each of the discharge treatment units 30a, 30b, and 30c. Five of the wire electrodes 6a, 6b, 6c, 6d, and 6e are provided in the discharge treatment unit 30a positioned at an upper part of the treatment tank 1, four of the wire electrodes 6a, 6b, 6c, and 6d are provided in the discharge treatment unit 30b positioned at a middle part of the treatment tank 1, and three of the wire electrodes 6a, 6b, and 6c are provided in the discharge treatment unit 30c positioned at a lower part of the treatment tank 1. All other configurations are the same as those of the first embodiment.

In the configuration of the third embodiment indicated in FIG. 5, the volumetric capacities of water reservoir portions 32a and 32b of ozone dissolution units 31a and 31b differ from each other. A height of a sidewall 19a of the ozone dissolution unit 31a is comparatively low and a volumetric capacity of the water reservoir portion is comparatively low, whereas a height of a sidewall 19b of the ozone dissolution unit 31b is comparatively high and a volumetric capacity of the water reservoir portion 32b is comparatively high. All other configurations are the same as those of the first embodiment.

In the third embodiment, when the water to be treated 4 passes through the discharge treatment units 30a, 30b, and 30c, respective numbers of wire electrodes thereof differ such that an amount of hydrogen peroxide dissolved is further upstream in order of the discharge treatment units 30a, 30b, and 30c.

Further, when the water to be treated 4 passes through the upper ozone dissolution unit 31a, a volumetric capacity of the water reservoir portion 32a is comparatively low, such that a contact time with ozone is shorter. For this reason, an amount of ozone dissolved is smaller in comparison to when the water to be treated 4 passes through the ozone dissolution unit 31b. Conversely, when the water to be treated 4 passes through the lower ozone dissolution unit 31b, a volumetric capacity of the water reservoir portion 32b is comparatively high, such that a contact time with ozone is longer. For this reason, the amount of ozone dissolved is larger than when the water to be treated 4 passes through the ozone dissolution unit 31a.

In the first embodiment, configurations of each of the discharge treatment units 30a, 30b, and 30c and configurations of each of the ozone dissolution units 31a and 31b are respectively all the same. For this reason, when the water to be treated 4 flows from upstream to downstream, the amounts of ozone and hydrogen peroxide dissolved are the same at each stage.

Meanwhile, in the third embodiment, an amount of ozone dissolved is smaller upstream and an amount of hydrogen peroxide dissolved is larger upstream. For this reason, the configuration of the third embodiment allows for even more efficient water treatment than the first embodiment. The reason for this is explained below.

The reaction of OH (l) in the above formula (9) is crucial to decomposition of persistent substances in the water to be treated 4 and, in order to generate OH (l), concentrations of both $O_3$ (l) and $H_2O_2$ (l) are required to be appropriately regulated in the above formula (8).

In general, a generation speed at which hydrogen peroxide is generated by a discharge is lower than a generation speed of ozone. For this reason, a dissolved ozone concentration in the water to be treated 4 increases abruptly at an upstream side of the treatment tank 1, whereas a dissolved hydrogen peroxide concentration increases gradually. For this reason, $H_2O_2$ (l) concentration is rate limiting in the above formula (8) at the upstream side of the treatment tank 1.

Meanwhile, the dissolved ozone concentration reaches saturation over a short time period, whereas the dissolved hydrogen peroxide concentration increases as discharge power increases. For this reason, in a downstream side of the treatment tank 1, $H_2O_2$ (l) is abundant and $O_3$ (l) is insufficient.

Moreover, through decomposition of organic substance in the water to be treated 4, hydrogen peroxide is formed as a by-product, and $H_2O_2$ (l) increases even further. For this reason, $O_3$ (l) concentration is rate limiting in the above formula (8) in the downstream side of the treatment tank 1. In this way, the rate limiting conditions of the above formula (8) change between the upstream side and the downstream side of the treatment tank 1, and generation of OH (l) is limited.

Here, in the third embodiment, the amount of hydrogen peroxide dissolved is larger in discharge treatment units that are positioned further toward the upstream side. In addition, the amount of ozone dissolved is larger in ozone dissolution units that are positioned further toward the downstream side. For this reason, the reaction of the above formula (8) can be efficiently caused to occur across the entire treatment tank 1 and, as a result, decomposition of organic substance including persistent substances by the above formula (9) occurs effectively.

Note that, in the third embodiment, respective numbers of the wire electrodes in the discharge treatment units 30a, 30b, and 30c are 5, 4, and 3 and, regarding the ozone dissolution units 31a and 31b, the volumetric capacity of the water reservoir portion 32b is set to be higher than the volumetric capacity of the water reservoir portion 32a. However, the numbers of wire electrodes and the volumetric capacities of the water reservoirs are not limited to such a configuration, and can be set as appropriate in accordance with a water quality or an amount of water to be treated of the water to be treated 4.

Fourth Embodiment

Figure 6:
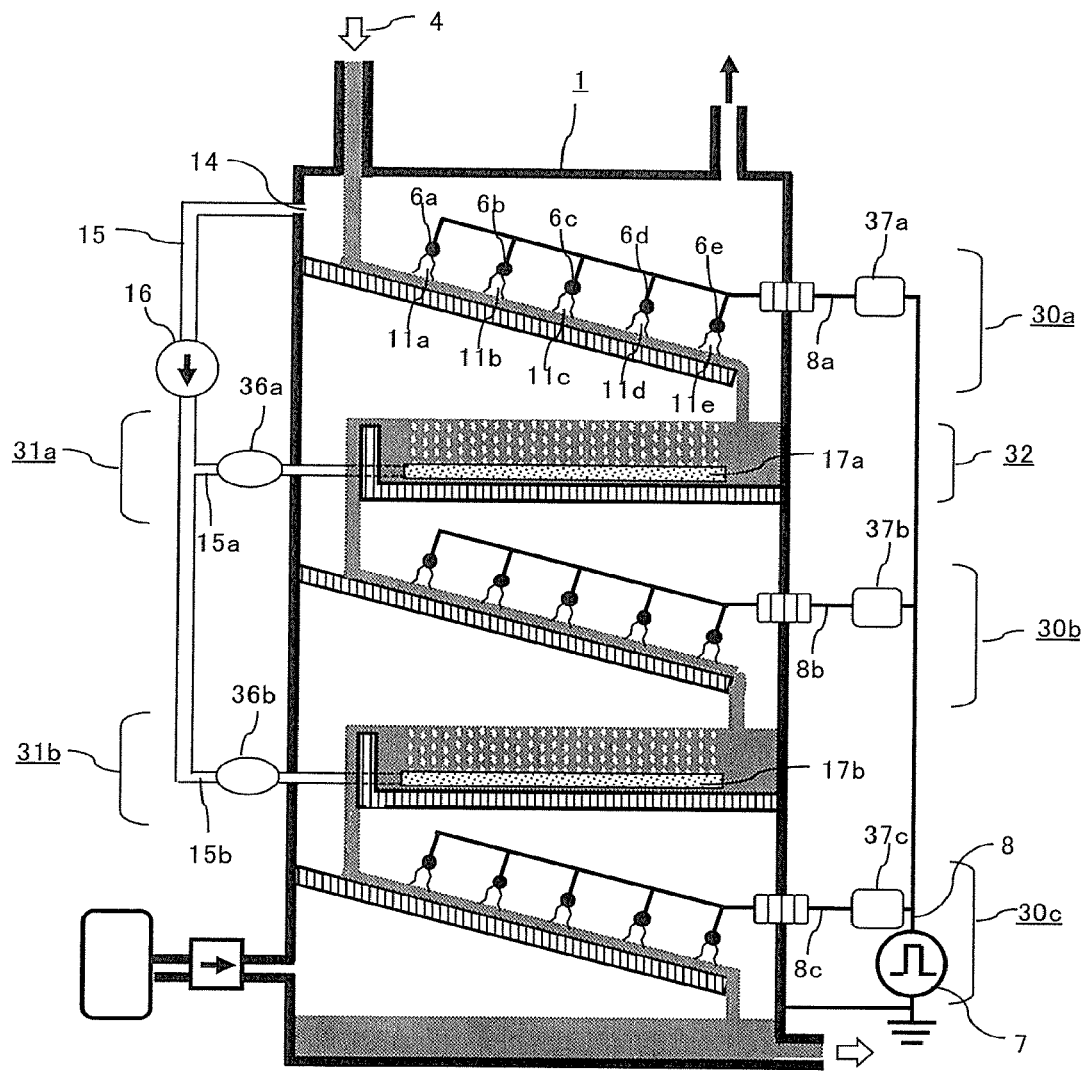
FIG. 6 is a cross-sectional view of a water treatment apparatus according to a fourth embodiment of the present invention.

FIG. 6 is a cross-sectional view of a water treatment apparatus according to a fourth embodiment of the present invention. In the fourth embodiment, circulated gas flow controllers 36a and 36b, that is, gas flow rate controllers, are provided respectively in the circulated gas pipes 15a and 15b. Further, matching units 37a, 37b, and 37c, that is, discharge power controllers, are provided respectively along wires 8a, 8b, and 8c. Other configurations are the same as those of the first embodiment.

In FIG. 6, gas sucked out from the circulated gas suction port 14 by the circulation pump 16 is independently flow rate regulated by the respective circulated gas flow controllers 36a and 36b, and supplied to diffuser plates 17a and 17b of ozone dissolution units 31a and 31b.

A high voltage pulse voltage output from a pulse power supply 7 is independently impedance-regulated by the respective matching units 37a, 37b, and 37c, and applied to wire electrodes 6a, 6b, 6c, 6d, and 6e of discharge treatment units 30a, 30b, and 30c. As a result, discharges are formed by independently regulated power in each of the discharge treatment units 30a, 30b, and 30cc. Other operations of the water treatment apparatus according to the fourth embodiment are the same as those of the first embodiment.

With the fourth embodiment, respective flow rates of the circulated gas supplied to the ozone dissolution units 31a and 31b can be independently regulated. Therefore, an amount of ozone dissolved can also be independently regulated. Further, the power of the discharges generated in the discharge treatment units 30a, 30b, and 30c can also be independently regulated. Therefore, an amount of hydrogen peroxide dissolved can also be independently regulated.

Providing such a configuration means that, unlike in the water treatment apparatuses described in the first and second embodiments, for example, the amounts of ozone and hydrogen peroxide dissolved can be made to differ from upstream toward downstream. For this reason, the reaction of the above formula (8) can be caused to occur efficiently throughout the entirety of the treatment tank 1 and, as a result, decomposition of organic substance containing persistent substances by the above formula (9) takes place effectively.

The water treatment apparatus according to the fourth embodiment differs from the water treatment apparatus indicated in the third embodiment in that the amounts of ozone and hydrogen peroxide dissolved at each of the discharge treatment units 30a, 30b, and 30c and the ozone dissolution units 31a and 31b can be easily changed. For this reason, even when a water quality, an amount of water to be treated, or the like of the water to be treated 4 change, water treatment can be performed under optimal conditions without having to refit the apparatus.

Note that the matching units 37a, 37b, and 37c adjust the impedance of the discharge treatment units 30a, 30b, and 30c as viewed from the pulse power supply 7 so as to regulate the respective discharge powers thereof. Electric elements such as coils, capacitors, resistors, and the like can be combined and used as appropriate with such matching units 37a, 37b, and 37c.

Further, a mass flow controller, for example, can be used as the circulated gas flow controllers 36a and 36b. However, it is possible to enable the flow rate to be regulated more easily by using a needle valve or the like.

Fifth Embodiment

Figure 7:
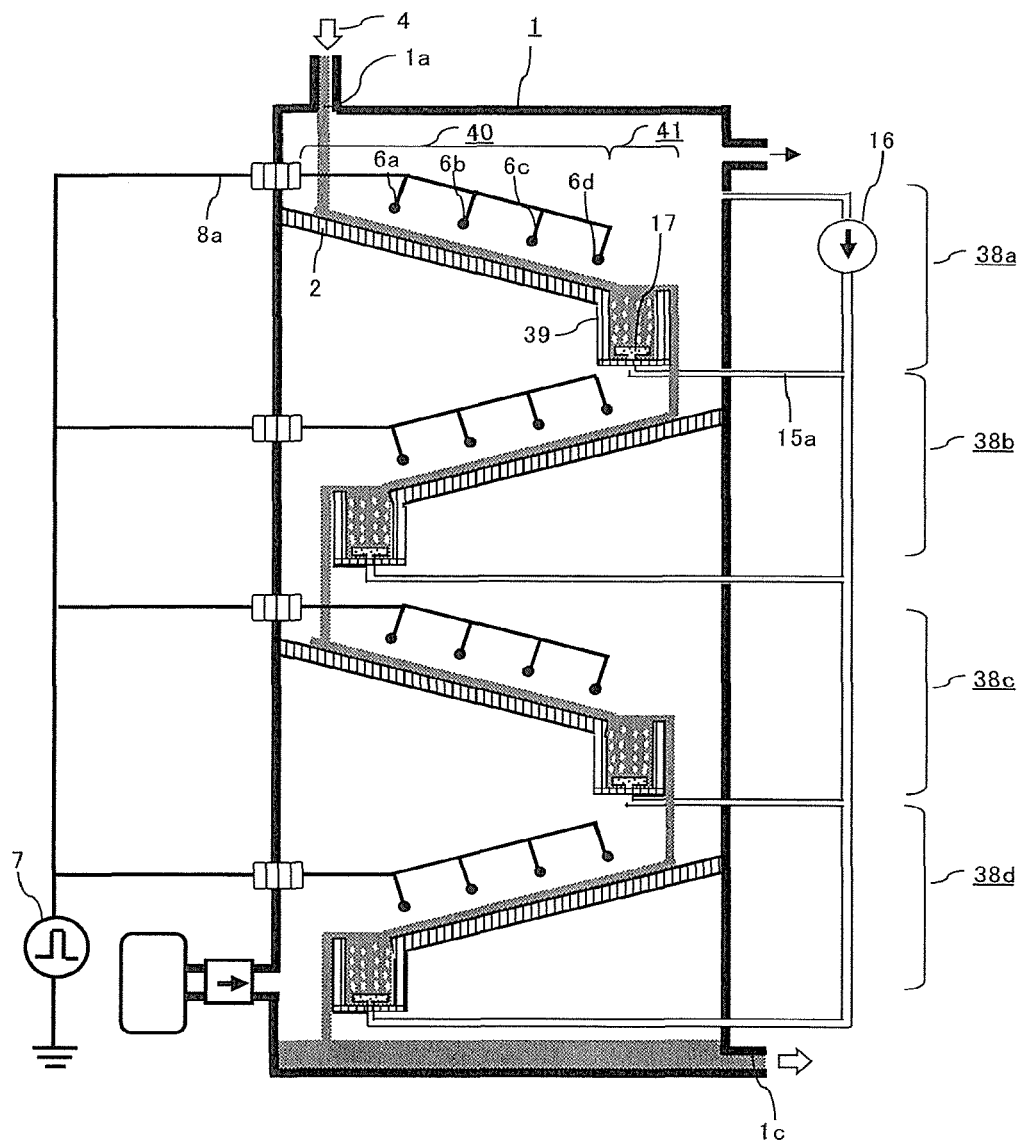
FIG. 7 is a cross-sectional view of a water treatment apparatus according to a fifth embodiment of the present invention.

FIG. 7 is a cross-sectional view of a water treatment apparatus according to a fifth embodiment of the present invention. In the fifth embodiment, a discharge treatment section 40 and an ozone dissolution section 41 are connected to each other to form integrated treatment units 38a, 38b, and 38c, and 38d, and a plurality of (four in FIG. 7) the treatment units are provided in the interior of a treatment tank 1.

In FIG. 7, the discharge treatment section 40 includes a flat plate electrode 2, which corresponds to a ground electrode, and a plurality of (four in FIG. 7) wire electrodes 6a, 6b, 6c, and 6d, which correspond to a discharge electrode. The flat plate electrode 2 is disposed in the interior of the treatment tank 1 at an incline with respect to a horizontal plane. In other words, an upstream side end portion (a left end portion in FIG. 7) of the flat plate electrode 2 is higher than a downstream side end portion (a right end portion in FIG. 7) thereof.

The wire electrodes 6a, 6b, 6c, and 6d are connected to the pulse power supply 7 by a wire 8a. The ozone dissolution section 41 is provided with a water storage tank 39, that is, a water reservoir portion, and a diffuser plate 17, which corresponds to a diffusing member and is installed in an interior of the water storage tank 39. The diffuser plate 17 is connected to a circulation pump 16 by a circulated gas pipe 15a. In other words, the diffuser plate 17, the circulated gas pipe 15a, and the circulation pump 16 constitute an ozone supply section.

A downstream side end portion of the flat plate electrode 2 and an uppermost part of the water storage tank 39 are connected to each other. The discharge treatment section 40 and the ozone dissolution section 41 are thereby integrated to form the treatment unit 38a.

Four treatment units 38a, 38b, 38c, and 38d are formed in the interior of the treatment tank 1 so as to mutually alternate between left and right in a plumb direction. Hence, water to be treated 4 supplied from an uppermost part of the treatment tank 1 continuously flows downward in order of the treatment units 38a, 38b, 38c, and 38d.

Next, operations of the water treatment apparatus according to the fifth embodiment will be described. The water to be treated 4 supplied into the treatment tank 1 from the water supply port 1a flows downward on the flat plate electrode 2 of the treatment unit 38a. Further, the water to be treated 4 having passed over the downstream side end portion of the flat plate electrode 2 runs down into the water storage tank 39.

As a set period of time elapses, a water level of the water storage tank 39 rises, the water to be treated 4 runs down along a sidewall (a right side surface in FIG. 7) of the water storage tank 39 and drops downward onto the flat plate electrode 2 of the treatment unit 38b. Therebelow, the water to be treated 4 having flowed similarly through the treatment units 38b, 38c, and 38d in this order collects at a bottom of the treatment tank 1 and is drained from the drainage port 1c.

Here, the pulse power supply 7 is operated so as to form a discharge between the wire electrodes 6a, 6b, 6c, and 6d and the flat plate electrode 2. Further, the circulation pump 16 is operated so as to suck out and cause gas in the treatment tank 1 to be discharged from the diffuser plate 17. As a result, in the discharge treatment section 40, the water to be treated 4 is treated by the reactions of the above formulas (5) and (9), and in the ozone dissolution section 41, the water to be treated 4 is treated by the reaction of the above formula (9).

In the fifth embodiment, the treatment units 38a, 38b, 38c, and 38d formed by integration of the discharge treatment section 40 and the ozone dissolution section 41 are provided. Therefore, it is unnecessary to provide the discharge treatment units 30a, 30b, and 30c and the ozone dissolution units 31a and 31b separately as in the first embodiment. Accordingly, an apparatus configuration is simplified and a number of parts is reduced, such that a cost of the apparatus can be suppressed.

Note that, in the fifth embodiment, the downstream side end portion of the flat plate electrode 2 and the uppermost part of the water storage tank 39 are connected to each other, and the discharge treatment section 40 and the ozone dissolution section 41 are integrated to form the treatment unit 38a. However, a configuration of the integrated treatment unit 38a is not limited to such a configuration. For example, it may also be made such that the flat plate electrode 2 has a recess, the recess being used as a water reservoir and further provided with the diffuser plate 17.

Sixth Embodiment

Figure 8:
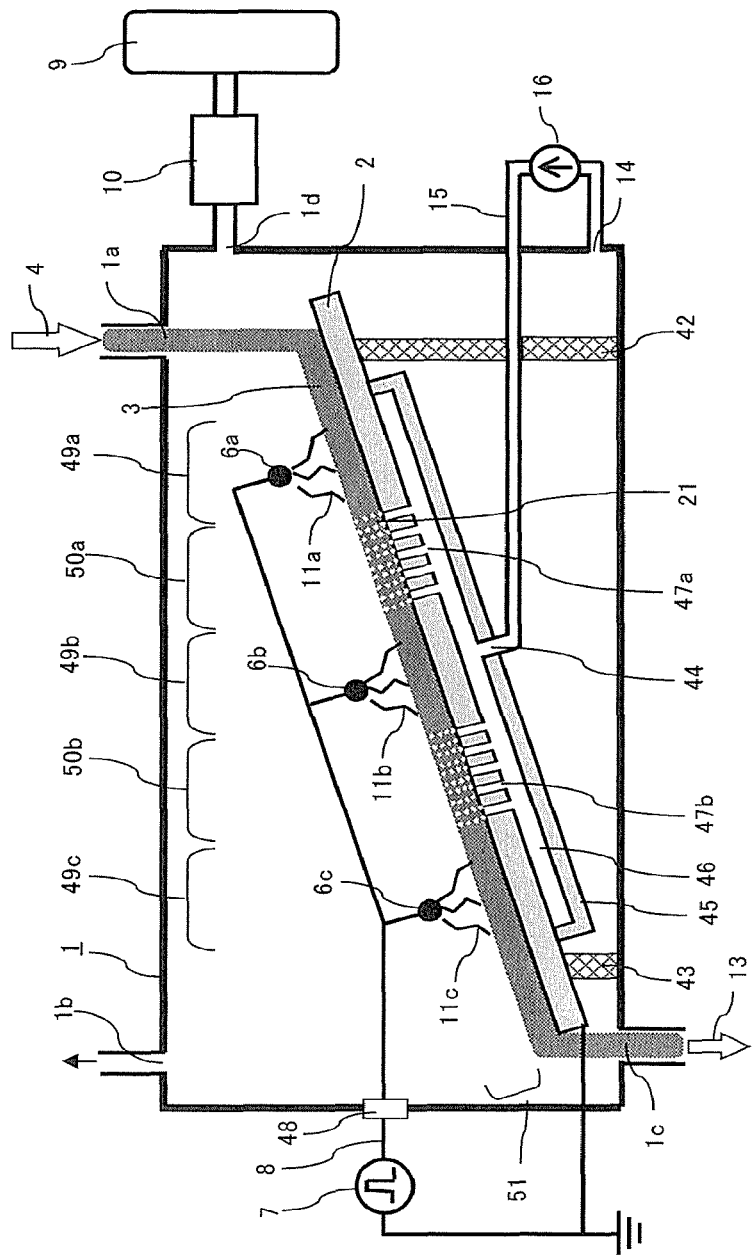
FIG. 8 is a cross-sectional view of a water treatment apparatus according to a sixth embodiment of the present invention.

FIG. 8 is a cross-sectional view of a water treatment apparatus according to a sixth embodiment of the present invention. In FIG. 8, a water supply port 1a and a gas exhaust port 1b are provided at an upper portion of a metal treatment tank 1 having a hermetically sealed structure. A drainage port 1c is provided at a lower part of the treatment tank 1. A gas supply port 1d is provided on a side surface of the treatment tank 1.

A flat plate electrode 2, which corresponds to a ground electrode, is housed in the treatment tank 1. The flat plate electrode 2 is supported by a gantry 42 and a gantry 43, which are stood on a bottom surface of the treatment tank 1, and is disposed at an inclined with respect to a horizontal plane. In other words, an upstream side end portion (a right end portion in FIG. 8) of the flat plate electrode 2 is higher than a downstream side end portion (a left end portion in FIG. 8) thereof.

The upstream side end portion of the flat plate electrode 2 is disposed directly below the water supply port 1a. Water to be treated 4 is supplied into the treatment tank 1 from the water supply port 1a, flows obliquely downward along an upper surface of the flat plate electrode 2, and is drained from the drainage port 1c to an outside of the treatment tank 1.

A gas supply source 9 filled with oxygen gas is connected to the gas supply port 1d via a flow controller 10. A plurality of (in this example, three) discharge treatment sections 49a, 49b, and 49c and a plurality of (in this example, two) ozone dissolution sections 50a and 50b are formed alternately on the flat plate electrode 2 in a flow direction of the water to be treated 4.

In other words, the discharge treatment section 49a is formed at a furthest upstream side, and the ozone dissolution section 50a, the discharge treatment section 49b, the ozone dissolution section 50b, and the discharge treatment section 49c are formed thereafter in this order.

The discharge treatment sections 49a, 49b, and 49c all have the same configuration, and wire electrodes 6a, 6b, and 6c, which correspond to a discharge electrode, are provided above the flat plate electrode 2. The wire electrodes 6a, 6b, and 6c are disposed at mutual intervals in a downstream direction of the water to be treated 4. In addition, the wire electrodes 6a, 6b, and 6c are disposed at equal intervals with respect to the upper surface of the flat plate electrode 2. Further, the wire electrodes 6a, 6b, and 6c are parallel to and horizontally stretched along a width direction of the flat plate electrode 2.

The ozone dissolution sections 50a and 50b both have the same configuration, and pluralities of pores 47a and 47b are formed in the flat plate electrode 2. A back plate 45 is hermetically connected to a lower surface of the flat plate electrode 2 via a buffer 46. Further, the back plate 45 is provided with a connection port 44, and a circulated gas pipe 15 is connected to the connection port 44.

A pulse power supply 7 is installed on an exterior of the treatment tank 1. The wire electrodes 6a, 6b, and 6c are connected in parallel to the pulse power supply 7 via a wire 8. The pulse power supply 7 is electrically insulated from the treatment tank 1 by an insulating body 48. The flat plate electrode 2 is electrically grounded.

A circulated gas suction port 14 is provided on a side surface of the treatment tank 1, and the circulated gas suction port 14 and the connection port 44 are connected to each other by the circulated gas pipe 15. Further, a circulation pump 16 is provided in the circulated gas pipe 15. An ozone supply section is formed by the circulation pump 16, the circulated gas pipe 15, and the pores 47a and 47b.

Next, operations of the water treatment apparatus in the sixth embodiment will be described. The water to be treated 4 supplied into the treatment tank 1 from the water supply port 1a flows downward while forming a water film 3 on the flat plate electrode 2, and is drained from the drainage port 1c. Here, a gap 51, that is, a gas layer, is formed between the water film 3 and the wire electrodes 6a, 6b, and 6c. In other words, a thickness of the water film 3 is regulated such that the gap 51 is formed between the wire electrodes 6a, 6b, and 6c and a water surface of the water film 3.

Here, by operating the pulse power supply 7 and applying a pulse voltage to the wire electrodes 6a, 6b, and 6c, discharges 11a, 11b, and 11c are formed in a direction of the flat plate electrode 2 from the wire electrodes 6a, 6b, and 6c. Further, by operating the circulation pump 16, the gas in the treatment tank 1 is sucked out from the circulated gas suction port 14 and caused to be released from the connection port 44.

The water to be treated 4 flowing on the flat plate electrode 2 is initially treated by the reactions of the above formulas (5) and (9) by contacting the discharge 11a in the discharge treatment section 49a. Next, in the ozone dissolution section 50a, the circulated gas sucked out from the treatment tank 1 forms bubbles 21 and rises in the water to be treated 4. In other words, the flat plate electrode 2 itself functions as a water reservoir portion.

As a result, ozone in the circulated gas dissolves in the water to be treated 4, and treatment by the above formula (9) is performed. Thereafter, the water to be treated 4 passes through the discharge treatment section 49b, the ozone dissolution section 50b, and the discharge treatment section 49c so as to become treated water 13 and is drained from the drainage port 1c. Detailed principles of the water treatment are the same as in the first embodiment.

With the sixth embodiment, a single flat plate electrode 2 can be used to form a plurality of discharge treatment sections and a plurality of ozone dissolution sections that alternate. Therefore, in comparison to the first embodiment, the water treatment apparatus can be constructed with fewer component parts, while enabling the same effect to be obtained.

Note that the flat plate electrode 2, the wire electrodes 6a, 6b, and 6c, and the back plate 45 shown in the sixth embodiment may be formed as a single cartridge, and a plurality of cartridges may be provided in the interior of the treatment tank 1. In such a case, the water to be treated 4 is set so as to continuously flow through each of the cartridges. As a result, higher water treatment performance can be obtained than when only one cartridge is provided.

Further, in the sixth embodiment, three of the discharge treatment sections 49a, 49b, and 49c and two of the ozone dissolution sections 50a and 50b are provided. However, respective numbers thereof are not limited thereto, and can be set as appropriate in accordance with a water quality and amount of water to be treated of the water to be treated 4.

Further, the upper surface of the flat plate electrode 2 in regions having the fine holes 47a and 47b can be sunken in comparison to other regions. In this way, a volumetric capacity of the water reservoir portion can be increased, and an amount of ozone dissolved at the ozone dissolution sections 50a and 50b can be increased.

Seventh Embodiment

Figure 9:
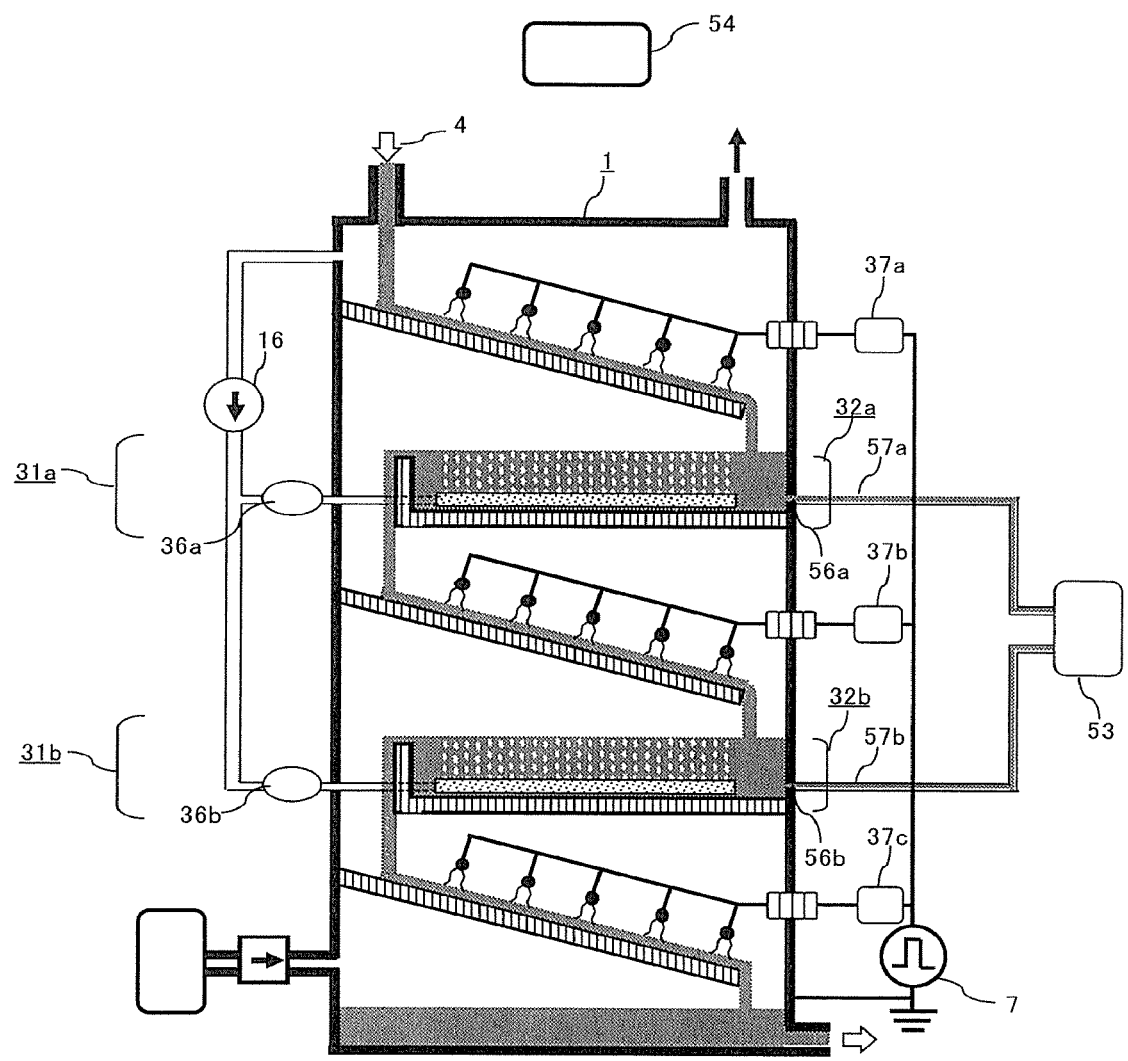
FIG. 9 is a cross-sectional view of a water treatment apparatus according to a seventh embodiment of the present invention.

FIG. 9 is a cross-sectional view of a water treatment apparatus according to a seventh embodiment of the present invention. In FIG. 9, a sampling port 56a is provided, on a side of a treatment tank 1, in a sidewall of a water reservoir portion 32a of an ozone dissolution unit 31a. A sampling pipe 57a is connected to the sampling port 56a.

Similarly, a sampling port 56b is provided, on the side of the treatment tank 1, in a sidewall of a water reservoir portion 32b of an ozone dissolution unit 31b. A sampling pipe 57b is connected to the sampling port 56b.

The sampling pipes 57a and 57b are respectively connected to a water quality meter 53. Further, a control unit 54, that is, a general controller, is provided on an exterior the treatment tank 1. Other configurations are the same as those of the fourth embodiment.

Figure 10:
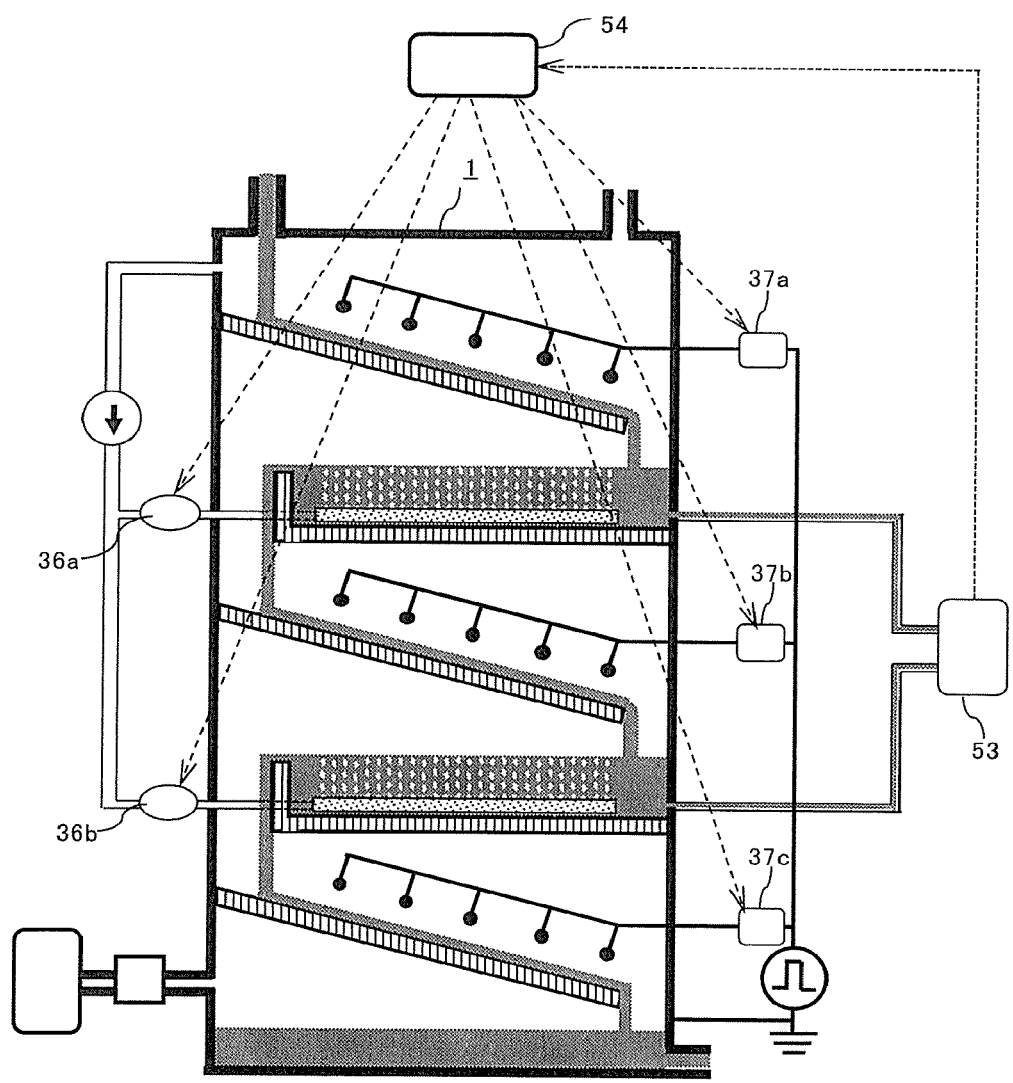
FIG. 10 is a system drawing of the water treatment apparatus according to the seventh embodiment of the present invention.

FIG. 10 is a system diagram of the water treatment apparatus according to the seventh embodiment of the present invention. In FIG. 10, the control unit 54 and the water quality meter 53 are connected to each other by a signal line. Further, the control unit 54 and circulated gas flow controllers 36a and 36b are also connected to each other by signal lines. Moreover, the control unit 54 and the matching units 37a, 37b, and 37c are also connected to each other by signal lines.

Next, operations of the water treatment apparatus according to the seventh embodiment will be described. A water quality of water to be treated 4 having collected in the water reservoir portions 32a and 32b is analysed by the water quality meter 53. Water quality data analysed by the water quality meter 53 are, for example, a dissolved ozone concentration, a dissolved hydrogen peroxide concentration, or an organic substance concentration.

The water quality data obtained by the water quality meter 53 is sent to the control unit 54. The control unit 54 controls the circulated gas flow controllers 36a and 36b and the matching units 37a, 37b, and 37c on the basis of the water quality data received from the water quality meter 53.

Hence, a flow rate of the circulated gas supplied to the ozone dissolution units 31a and 31b and a discharge power supplied to the discharge treatment units 30a, 30b, and 30c are regulated. In other words, by providing the configuration in FIG. 10, the control unit 54 can operate the ozone dissolution units 31a and 31b and the discharge treatment units 30a, 30b, and 30c under optimal conditions corresponding to the water quality of the water to be treated 4.

For example, hydrogen peroxide may be formed as a by-product in the process of organic substance decomposition in the water to be treated 4. In this case, a concentration of $H_2O_2$ (l) becomes excessive and $H_2O_2$ (l) consumes OH (l) ineffectively as a radical scavenger. However, the control unit 54 in the seventh embodiment recognises that the concentration of $H_2O_2$ (l) in the water reservoir portion 32a is excessive on the basis of the water quality data from the water quality meter 53.

In view of this, the control unit 54 regulates the matching units 37b and 37c so as to lower the discharge power of the discharge treatment units 30b and 30c, thereby suppressing an amount of hydrogen peroxide dissolved. Further, the control unit 54 regulates the circulated gas flow controller 36b so as to increase the flow rate of the circulated gas supplied to the ozone dissolution unit 31b, thereby increasing an amount of ozone dissolved. As a result, an appropriate concentration balance between $H_2O_2$ (l) and $O_3$ (l) is realised, such that efficient water treatment can be performed.

As a separate example of control, when the concentration of organic substance in the water to be treated 4 is low or when a large amount of easily decomposable substances are contained therein, the control unit 54 recognises that the concentration of organic substance in the water reservoir portion 32b is sufficiently low on the basis of the water quality data from the water quality meter 53. In this case, the control unit 54 controls the matching unit 37c so as to stop the discharges of the discharge treatment unit 30c. Hence, unnecessary discharges after the organic substance has been decomposed are eliminated, and energy efficiency of the water treatment is improved.

Eighth Embodiment

Figure 11:
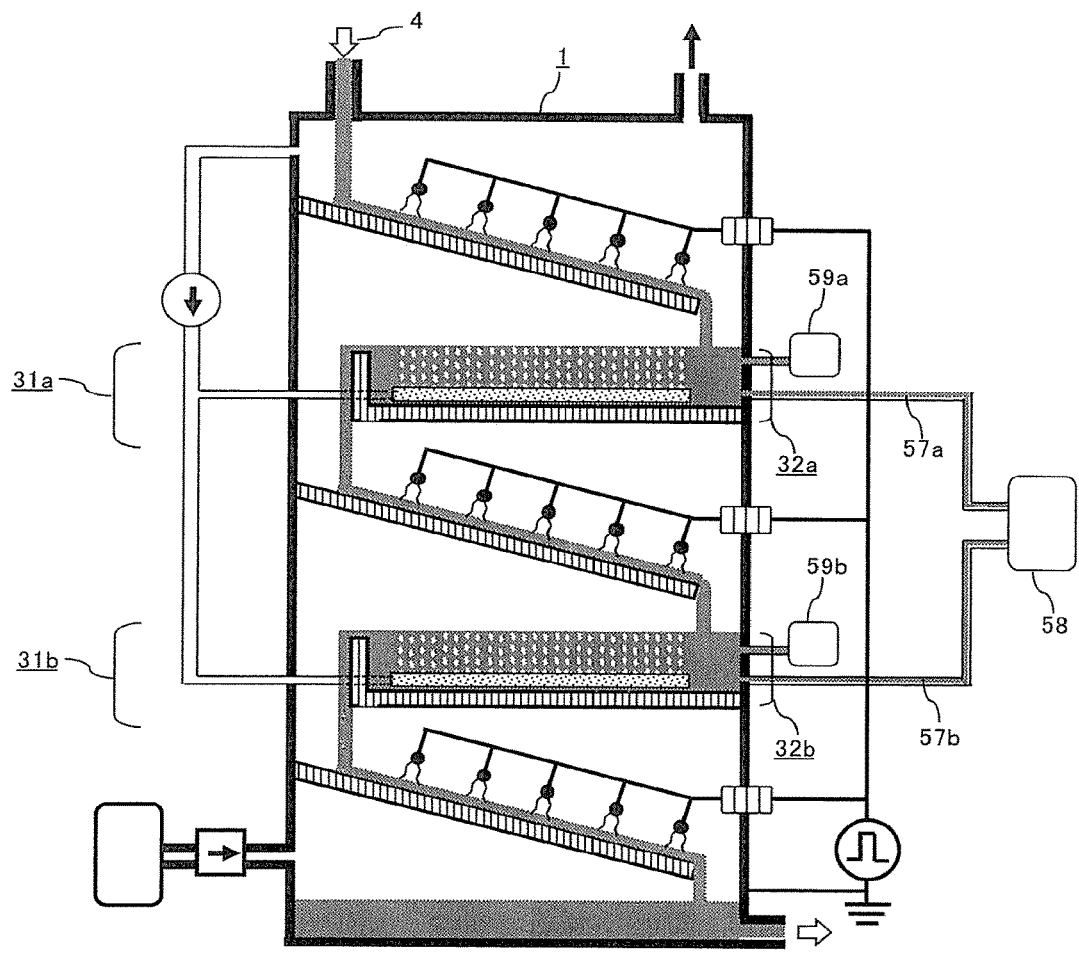
FIG. 11 is a cross-sectional view of a water treatment apparatus according to an eighth embodiment of the present invention.

FIG. 11 is a cross-sectional view of a water treatment apparatus according to an eighth embodiment of the present invention. In FIG. 11, a sampling pipe 57a is connected to a water reservoir portion 32a of an ozone dissolution unit 31a, and a sampling pipe 57b is connected to a water reservoir portion 32b of an ozone dissolution unit 31b.

The sampling pipes 57a and 57b are respectively connected to a pH meter 58. In addition, pH regulators 59a and 59b are respectively connected to the water reservoir portions 32a and 32b. Other configurations are the same as those of the first embodiment.

In the eighth embodiment, a pH of water to be treated 4 in the water reservoir portions 32a and 32b is measured by the pH meter 58. The pH regulators 59a and 59b regulate the pH of the water to be treated 4 in the water reservoir portions 32a and 32b to a value that is suitable for water treatment on the basis of pH values measured by the pH meter 58. Other operations are the same as those of the first embodiment.

The frequency of OH (l) generation reactions between $H_2O_2$ (l) and $O_3$(l) (in other words, the reaction of the above formula (8)) depends on pH, and close to neutral (pH=around 7) is generally preferable. However, depending on the water quality of the water to be treated 4, pH may change as water treatment progresses.

For example, pH may decrease due to generation of organic acids such as formic acid or acetic acid as by-products of organic substance decomposition in the water to be treated 4. Alternatively, pH may decrease if, for example, sulfuric acid, amino acids, or the like are contained in the water to be treated 4, and sulfate ions or nitrate ions are formed in the decomposition process.

In such cases, the pH regulators 59a and 59b supply a basic substance such as sodium hydroxide, or add a buffer agent such as phosphate to the water reservoir portions 32a and 32b, thereby adjusting the pH of water to be treated 4 to around neutral. Hence, the water treatment apparatus according to the eighth embodiment can cause the reaction of the above formula (8) to occur efficiently and perform water treatment effectively.

Ninth Embodiment

Figure 12:
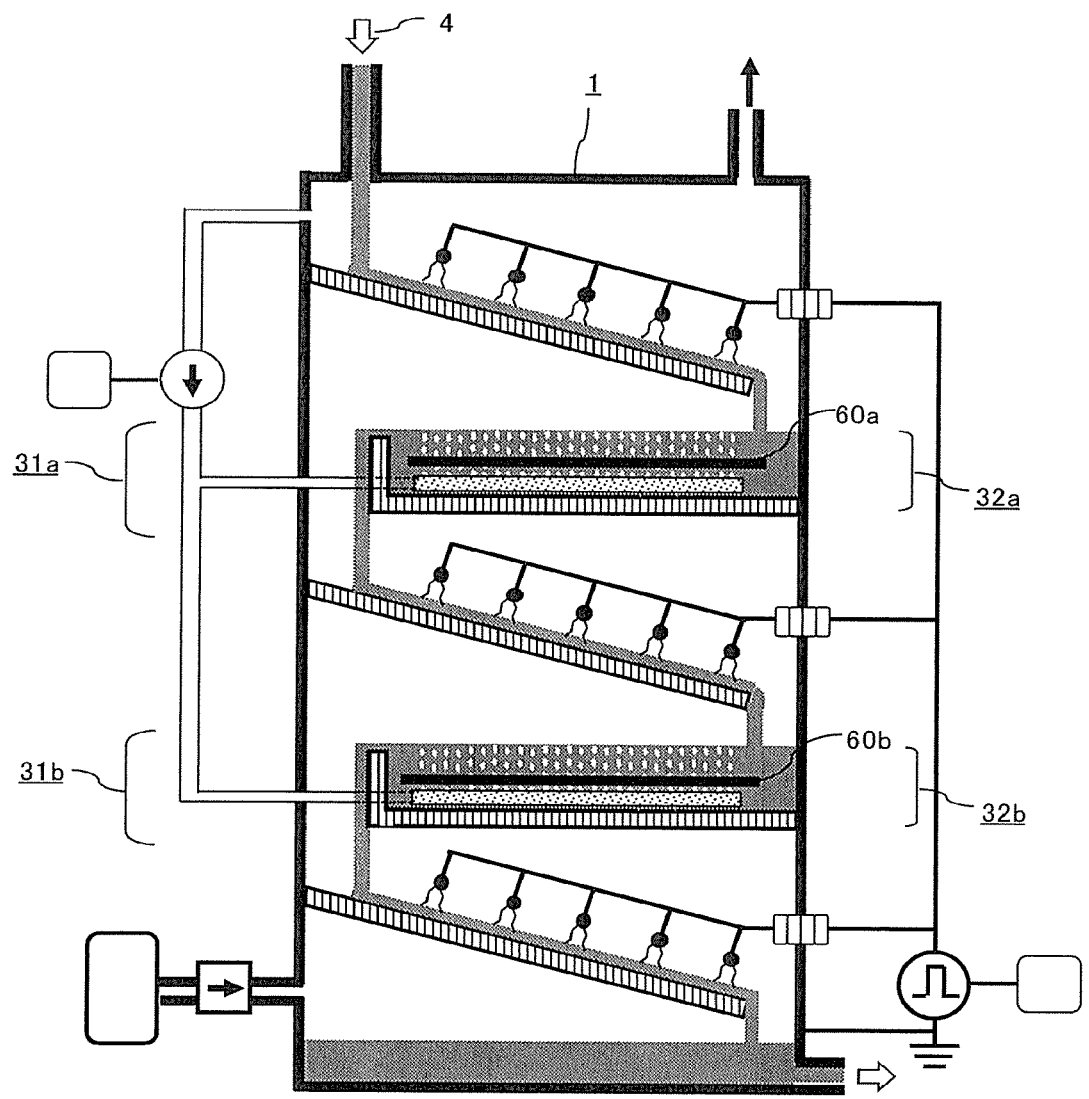
FIG. 12 is a cross-sectional view of a water treatment apparatus according to a ninth embodiment of the present invention.

FIG. 12 is a cross-sectional view of a water treatment apparatus according to a ninth embodiment of the present invention. In FIG. 12, ultraviolet lamps 60a and 60b are provided in respective water reservoir portions 32a and 32b of ozone dissolution units 31a and 31b so as to be immersed in water to be treated 4. Other configurations are the same as those of the first embodiment.

When water containing $O_3$ (l), $H_2O_2$ (l), or both is irradiated with ultraviolet light, OH (l) is generated by the reactions of the following formulas (12) and (13).

$$O_3(l)+h\nu \rightarrow OH(l) \tag{12}$$

$$H_2O_2(l)+h\nu \rightarrow OH(l) \tag{13}$$

For this purpose, as shown in FIG. 12, ultraviolet lamps 60a and 60b are provided in the water reservoir portions 32a and 32b, and the water to be treated 4 in the water reservoir portions 32a and 32b is irradiated with ultraviolet light, thereby facilitating water treatment by the above formula (9). Further, as ozone is continuously dissolved due to circulated gas, the reaction of the above formula (12) occurs continuously, such that high-speed and highly efficient water treatment is realized.

Note that, although the ultraviolet lamps are not limited to a particular configuration, a low pressure mercury lamp, an excimer lamp, an LED, or the like can be used. Further, a light intensity of the ultraviolet light may be regulated in accordance with a water quality or an amount of water to be treated of the water to be treated 4. Moreover, ultraviolet light does not necessarily need to be emitted constantly, and may be emitted intermittently.

Tenth Embodiment

Figure 13:
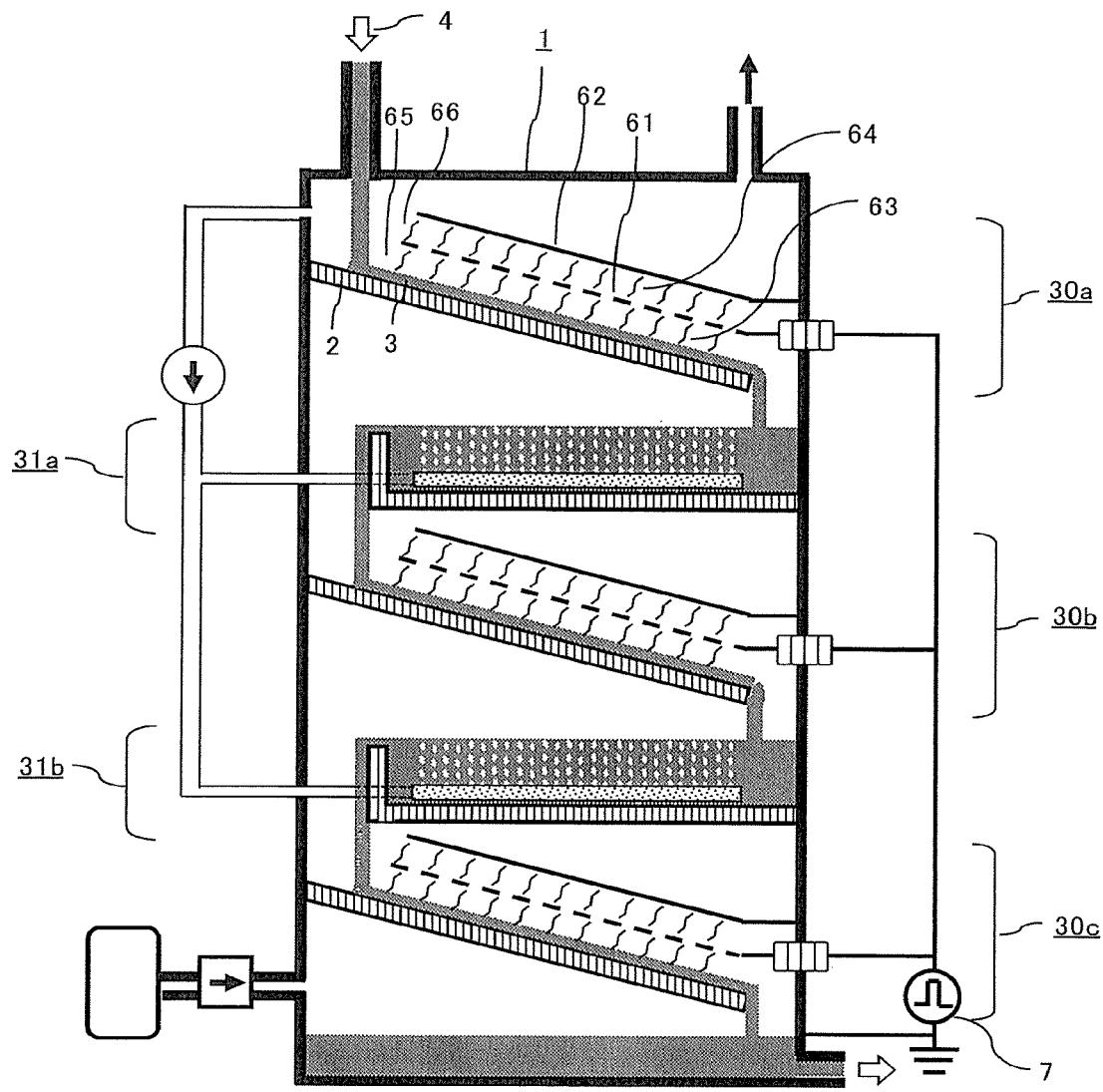
FIG. 13 is a cross-sectional view of a water treatment apparatus according to a tenth embodiment of the present invention.

FIG. 13 is a cross-sectional view of a water treatment apparatus according to a tenth embodiment of the present invention. In the tenth embodiment, a configuration of discharge treatment units 30a, 30b, and 30c differs from those of the first embodiment. In FIG. 13, the discharge treatment units 30a, 30b, and 30c all have the same configuration and are provided with a flat plate electrode 2 arranged at an incline with respect to a horizontal plane, a mesh electrode 61, that is, a discharge electrode, arranged above and parallel to the flat plate electrode 2 via a lower air gap 65, and a flat plate-shaped secondary flat plate electrode 62 arranged above and parallel to the mesh electrode 61 via an upper gap 66.

The mesh electrode 61 is connected to a pulse power supply 7, and both the flat plate electrode 2 and the secondary flat plate electrode 62 are electrically grounded. Other configurations are the same as those of the first embodiment.

In FIG. 13, the pulse power supply 7 is operated and a high voltage pulse voltage is applied to the mesh electrode 61. As a result, a discharge directed toward a water surface of a water film 3 formed by water to be treated 4 flowing along the flat plate electrode 2, that is, a lower discharge 63, is formed. At the same time, a gas phase discharge, that is, an upper discharge 64, is formed between the mesh electrode 61 and the secondary flat plate electrode 62. Other operations are the same as those of the first embodiment.

In the first embodiment, the discharges 11a, 11b, 11c, 11d, and 11e are formed only between the wire electrodes 6a, 6b, 6c, 6d, and 6e and the flat plate electrode 2. In this case, the discharges are directed toward the water film 3 such that a large amount of hydrogen peroxide is generated. In the tenth embodiment, however, in addition to the lower discharge 63 between the mesh electrode 61 and the flat plate electrode 2, the upper discharge 64 is also formed between the mesh electrode 61 and the secondary flat plate electrode 62.

With the lower discharge 63, that is, the discharge directed toward the water surface, a large amount of hydrogen peroxide is generated, and with the upper discharge 64, that is, the gas phase discharge, a large amount of ozone is generated. As a result, an amount of ozone generated increases in comparison to that in the first embodiment.

For example, when treating the water to be treated 4 containing a large amount of substances that are also easily decomposed by ozone, a large amount of ozone is consumed in the reaction of the above formula (9). In this case, with the first embodiment, the flow rate of the circulation pump 16 is increased so as to increase the amount of ozone dissolved in the water to be treated 4. However, since an amount of ozone in the treatment tank 1 is limited by the speed at which ozone is generated by the discharges 11a, 11b, 11c, 11d, and 11e, ozone may become insufficient.

However, with the tenth embodiment, the upper discharge 64 in the gas phase is formed in addition to the lower discharge 63 directed toward the water surface, such that a larger amount of ozone is generated. As a result, high-speed and highly efficient water treatment can be realized without ozone becoming insufficient.

Note that, although the mesh electrode 61 is used as the discharge electrode in the tenth embodiment, a configuration thereof is not limited to a mesh shape. A wire, a rod, a needle, a screw, a ribbon, a punching metal, or the like, for example, can be used as the discharge electrode.

Eleventh Embodiment

Figure 14:
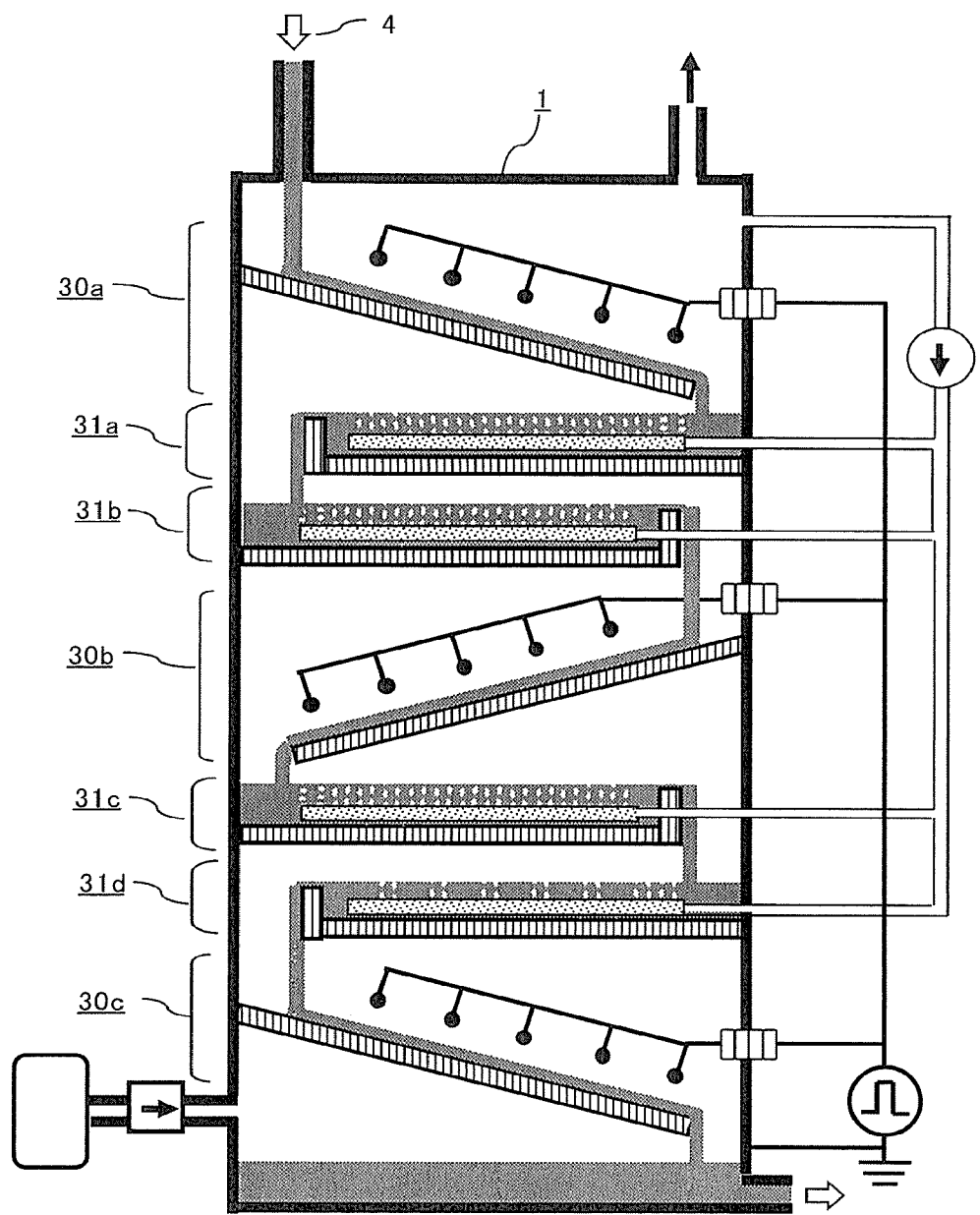
FIG. 14 is a cross-sectional view of a water treatment apparatus according to an eleventh embodiment of the present invention.

FIG. 14 is a cross-sectional view of a water treatment apparatus according to an eleventh embodiment of the present invention. In the eleventh embodiment, numbers and arrangements of discharge treatment units and ozone dissolution units differ from those of the first embodiment. In FIG. 14, three discharge treatment units 30a, 30b, and 30c and four ozone dissolution units 31a, 31b, 31c, and 31d are provided in an interior of a treatment tank 1.

In the treatment tank 1, the discharge treatment unit 30a is provided at an uppermost part thereof, the ozone dissolution unit 31a is provided below the discharge treatment unit 30a, the ozone dissolution unit 31b is provided below the ozone dissolution unit 31a, and the discharge treatment unit 30b is provided below the ozone dissolution unit 31b. Similarly therebelow, the ozone dissolution unit 31c, the ozone dissolution unit 31d, and, at a lowermost part of the treatment tank 1, the discharge treatment unit 30c, are provided in this order.

Water to be treated 4 continuously flows downward from the discharge treatment unit 30a positioned at the uppermost part to the discharge treatment unit 30c positioned at the lowermost part. Note that configurations of the discharge treatment units 30a, 30b, and 30c and the ozone dissolution units 31a, 31b, 31c, and 31d are both the same as those of the first embodiment.

In the first embodiment, the discharge treatment units and the ozone dissolution units are arranged alternately in a vertical direction. In the eleventh embodiment, however, two ozone dissolution units are arranged beneath one discharge treatment unit. Other configurations are the same as those of the first embodiment.

With the eleventh embodiment, a larger amount of ozone can be dissolved in the water to be treated 4 than with the first embodiment. Accordingly, even when a large amount of ozone is consumed due to a composition of the water to be treated 4, or even under conditions in which a large amount of hydrogen peroxide is generated as a by-product, efficient and high-speed water treatment can be achieved without causing ozone to be depleted.

Note that, in the eleventh embodiment, an arrangement is such that two of the ozone dissolution units are arranged under one of the discharge treatment units, however, the arrangement is not limited thereto and can be arbitrarily determined. For example, contrary to the eleventh embodiment, an arrangement can also be such that one ozone dissolution unit is arranged beneath two discharge treatment units. The arrangement ought to be determined as appropriate in accordance with a water quality of the water to be treated 4.

Further, a discharge treatment unit does not necessarily have to be located furthest upstream, and the same effect can also be obtained when an ozone dissolution unit is disposed furthest upstream with a discharging treatment unit disposed downstream therefrom.

Twelfth Embodiment

Figure 15:
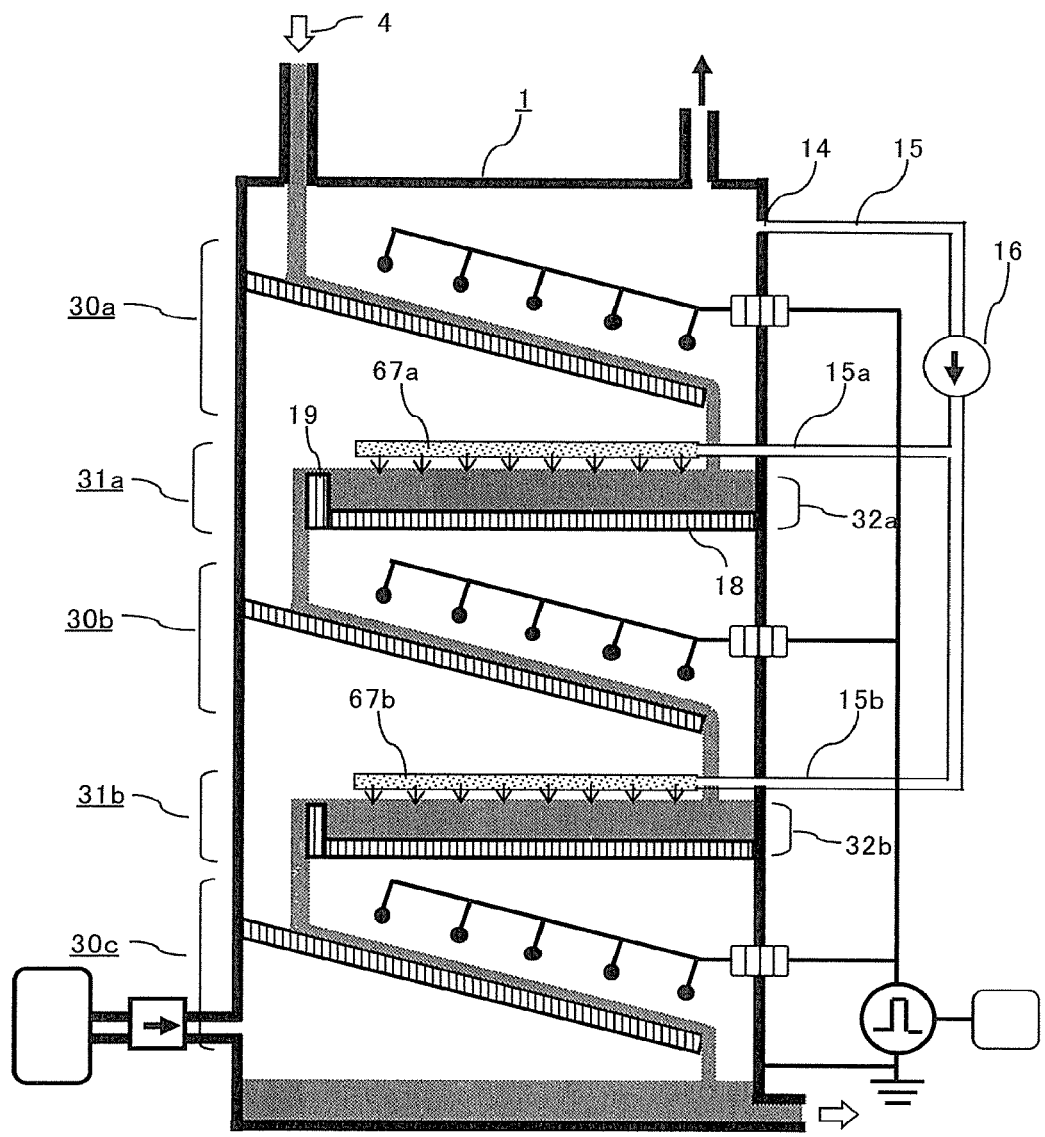
FIG. 15 is a cross-sectional view of a water treatment apparatus according to a twelfth embodiment of the present invention.

FIG. 15 is a cross-sectional view of a water treatment apparatus according to a twelfth embodiment of the present invention. In the twelfth embodiment, a configuration of ozone dissolution units differs from that of the first embodiment. In FIG. 15, ozone dissolution units 31a and 31b are formed from respective water reservoir portions 32a and 32b and an ozone supply section.

The water reservoir portions 32a and 32b both have the same configuration, and each have a base plate 18 and a sidewall 19. In FIG. 15, a right side end portion of the base plate 18 of the water reservoir portion 32a is connected to a right wall surface of the treatment tank 1 and the plate shaped sidewall 19 is attached to a left side end portion of the base plate 18 in a plumb direction. In other words, the water reservoir portions 32a and 32b constitute a box shape formed by the wall surface of the treatment tank 1, the base plate 18, and the sidewall 19.

Nozzles 67a and 67b, which correspond to diffusing members, are provided at positions higher than uppermost portions of the respective sidewalls 19 of the water reservoir portions 32a and 32b. The nozzles 67a and 67b are respectively connected to circulated gas pipes 15a and 15b, and a circulated gas pipe 15 is provided with a circulation pump 16.

In other words, in the twelfth embodiment, an ozone supply section is constituted by the circulation pump 16, the circulated gas pipes 15, 15a, and 15b, and the nozzles 67a and 67b. In addition, the nozzles 67a and 67b are attached such that a gas ejection direction thereof is downward with respect to FIG. 15.

Gas in the treatment tank 1 containing ozone having been sucked out by the circulation pump 16 passes through the circulated gas pipes 15, 15a, and 15b and the nozzles 67a and 67b, and is sprayed onto a water surface of the water to be treated 4 collected in the water reservoir portions 32a and 32b. As a result, ozone is dissolved in the water to be treated 4.

Other operations are the same as those of the first embodiment. In the first embodiment, ozone is supplied to the water to be treated 4 by the diffuser plates 17a and 17b in the water reservoir portions 32a and 32b. However, depending on a water quality of the water to be treated 4, the diffuser plates 17a and 17b may become clogged as a result of operation over a long period of time. In the twelfth embodiment, however, the nozzles 67a and 67b are not in contact with the water to be treated 4. For this reason, the nozzles 67a and 67b can be operated for long periods without clogging.

Thirteenth Embodiment

Figure 16:
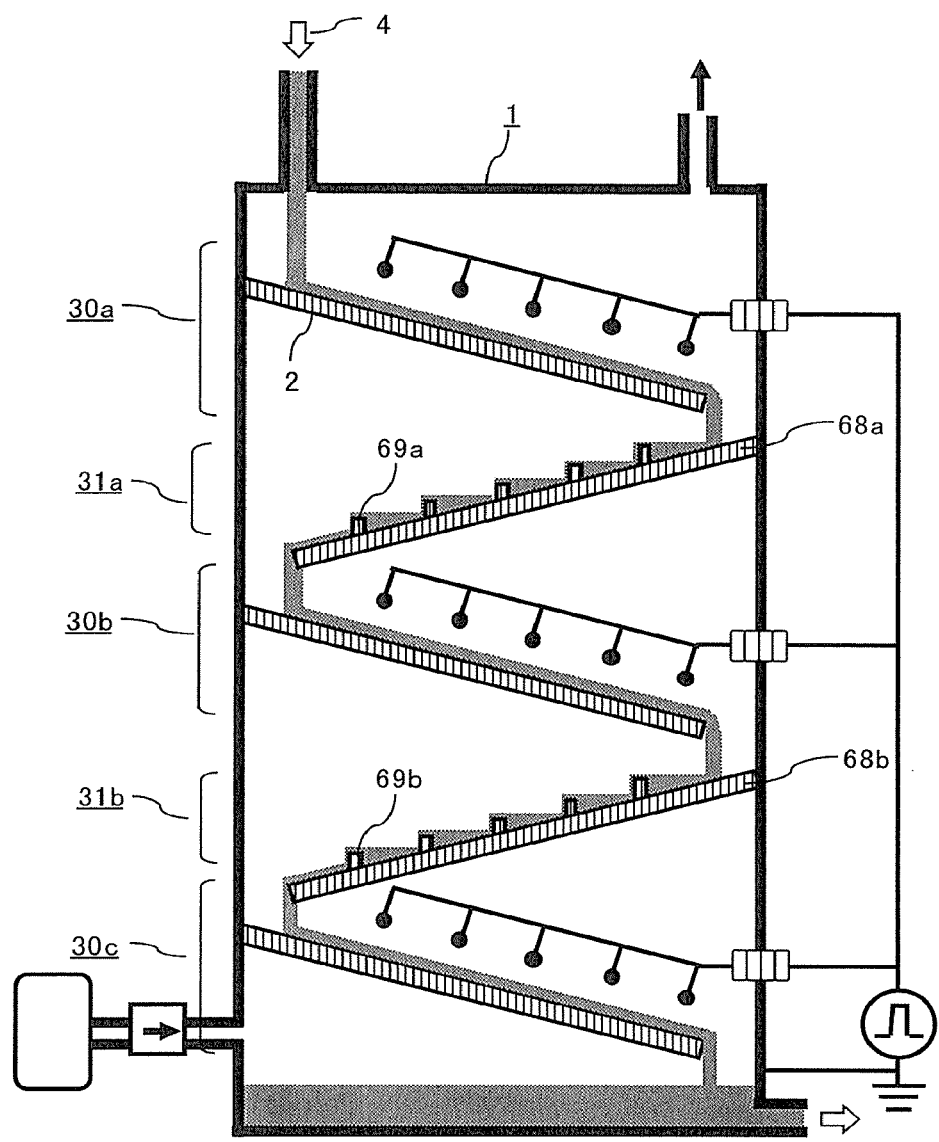
FIG. 16 is a cross-sectional view of a water treatment apparatus according to a thirteenth embodiment of the present invention.

FIG. 16 is a cross-sectional view of a water treatment apparatus according to a thirteenth embodiment of the present invention. In the thirteenth embodiment, a configuration of ozone dissolution units differs from that of the first embodiment. In FIG. 16, ozone dissolution units 31a and 31b are respectively constituted by inclined plates 68a and 68b and projections 69a and 69b.

The inclined plate 68a is provided at an incline with respect to a horizontal plane and is inclined in an opposite direction to a flat plate electrode 2 of a discharge treatment unit 30a positioned directly thereabove. Further, the inclined plate 68a is fixed, in the treatment tank 1, to a side surface thereof on an opposite side to the flat plate electrode 2 of the discharge treatment unit 30a positioned directly thereabove. The inclined plate 68b also has the same configuration.

As a result, water to be treated 4 supplied from an uppermost part of the treatment tank 1 flows downward as a continuous flow in order of the discharge treatment unit 30a, the inclined plate 68a, the discharge treatment unit 30b, the inclined plate 68b, and the discharge treatment unit 30c.

Pluralities of (five in FIG. 16) the projections 69a and 69b are respectively provided on upper surfaces of the inclined plates 68a and 68b. In the thirteenth embodiment, the water to be treated 4 stays in the interior of treatment tank 1 for a longer period of time than, for example, when the inclined plates 68a and 68b are not provided. In other words, the inclined plates 68a and 68b serve as water reservoir portions.

Further, when flowing downward on the inclined plates 68a and 68b, the water to be treated 4 is agitated by the projections 69a and 69b. As a result, contact frequency between ozone and the water to be treated 4 in the treatment tank 1 increases, and a large amount of ozone is dissolved in the water to be treated 4. In other words, the projections 69a and 69b serve as an ozone supply section.

Unlike the first embodiment, the thirteenth embodiment is not provided with a circulated gas suction port 14, circulated gas pipes 15, 15a, and 15b, a circulation pump 16, and diffuser plates 17a and 17b. However, in the thirteenth embodiment, the same effect as that of the first embodiment can be obtained using the inclined plates 68a and 68b (water reservoir portions) and the projections 69a and 69b (ozone supply sections). Accordingly, high-speed and highly efficient water treatment is performed with simpler and fewer component parts.

The invention claimed is:

1. A water treatment apparatus in which a plurality of discharge treatment units are provided in an interior of a treatment tank, the discharge treatment units including a ground electrode and a discharge electrode opposing the ground electrode, and water to be treated is treated by forming a discharge between the ground electrode and the discharge electrode, and generating ozone by the discharge, and moreover causing the water to be treated to contact the discharge, the water treatment apparatus comprising:
a water reservoir that collects, in the interior of the treatment tank, the water to be treated having been treated by one discharge treatment unit of the plurality of discharge treatment units; and
an ozone supply section that supplies the ozone in the treatment tank to the water to be treated collected in the water reservoir, wherein
the water to be treated passes through the plurality of discharge treatment units as a continuous flow, and
a plurality of ozone dissolution units comprising the water reservoir and the ozone supply section are provided in the interior of the treatment tank.

2. The water treatment apparatus of claim 1, wherein each of the plurality of discharge treatment units causes hydrogen peroxide to be dissolved in the water to be treated.

3. The water treatment apparatus of claim 1, wherein one of the plurality of ozone dissolution units is provided at a furthest upstream side of a flow of the water to be treated in the interior of the treatment tank.

4. The water treatment apparatus of claim 1, wherein one discharge treatment unit and one ozone dissolution unit are formed as a pair of integrated treatment units, and
a plurality of the integrated treatment units are arranged in stages in the interior of the treatment tank.

5. The water treatment apparatus of claim 1, wherein a configuration in which each of the plurality of discharge treatment units and each of the ozone dissolution units are alternately arranged is formed on a single flat plate electrode.

6. The water treatment apparatus of claim 1, wherein at least one ozone dissolution unit has an ultraviolet lamp for irradiating the water to be treated collected in the water reservoir with ultraviolet light.

7. The water treatment apparatus of claim 1, wherein the ground electrode is a flat plate electrode disposed at an incline with respect to a horizontal plane and the water to be treated flows along an upper surface of the flat plate electrode,
the discharge electrode is disposed so as to oppose the flat plate electrode via a water film formed by the water to be treated flowing on the flat plate electrode and a gas layer formed above the water film, and each of the plurality of discharge treatment units forms a discharge by applying a voltage between the flat plate electrode and the discharge electrode.

8. The water treatment apparatus of claim 7, wherein each of the plurality of discharge treatment units has a secondary flat plate electrode provided above the discharge electrode via a gap and disposed so as to oppose the flat plate electrode across the discharge electrode.

9. The water treatment apparatus of claim 1, wherein the plurality of discharge treatment units are arranged consecutively in a vertical row.

10. The water treatment apparatus of claim 1, wherein the water reservoir is a box-shaped water reservoir comprising a base plate and sidewalls arranged so as to enclose the base plate, and the water to be treated is collected in the water reservoir.

11. The water treatment apparatus of claim 1, wherein the ozone supply section comprises a pump, a circulation pipe, and a diffusing member, the diffusing member is disposed so as to be in contact with the water to be treated collected in the water reservoir, and the circulation pipe is connected so as to cause gas sucked out from the treatment tank by the pump to be discharged from the diffusing member, and causes the gas discharged from the diffusing member to be jetted into the water to be treated in the water reservoir.

12. A water treatment apparatus in which a plurality of discharge treatment units are provided in an interior of a treatment tank, the discharge treatment units including a ground electrode and a discharge electrode opposing the ground electrode, and water to be treated is treated by forming a discharge between the ground electrode and the discharge electrode, and generating ozone by the discharge, and moreover causing the water to be treated to contact the discharge, the water treatment apparatus comprising:
   a water reservoir that collects, in the interior of the treatment tank, the water to be treated having been treated by one discharge treatment unit of the plurality of discharge treatment units; and
   an ozone supply section that supplies the ozone in the treatment tank to the water to be treated collected in the water reservoir, wherein the water to be treated passes through the plurality of discharge treatment units as a continuous flow, the water reservoir is an inclined plate disposed at an incline with respect to a horizontal plane such that the water to be treated flows downward along an upper surface thereof, the ozone supply section comprises a projection provided on an upper surface of the inclined plate, and the projection agitates a flow of the water to be treated flowing downward on the inclined plate.

13. A water treatment method to be executed in a water treatment apparatus in which a plurality of discharge treatment units are provided in an interior of a treatment tank, the discharge treatment units including a ground electrode and a discharge electrode opposing the ground electrode, and water to be treated is treated by forming a discharge between the ground electrode and the discharge electrode and generating ozone by the discharge, and moreover causing the water to be treated to contact the discharge, the water treatment method comprising:

collecting the water, having been treated by one discharge treatment unit of the plurality of discharge treatment units, in a water reservoir in the interior of the treatment tank in a water reservoir; and supplying, in the interior of the treatment tank, the ozone in the treatment tank to the water to be treated collected in the water reservoir by an ozone supply section, wherein the water to be treated is treated by the water to be treated passing through the plurality of discharge treatment units as a continuous flow, and a plurality of ozone dissolution units comprising the water reservoir and the ozone supply section are provided in the interior of the treatment tank.

14. The water treatment method of claim 13, further comprising:

acquiring water quality data of the water to be treated via a water quality meter; and performing control such that power supplied from a common power supply is individually adjusted on the basis of the acquired water quality data and a discharge is formed using a desired discharge power.

* * * * *